United States Patent
Sawada et al.

(10) Patent No.: US 8,390,838 B2
(45) Date of Patent: Mar. 5, 2013

(54) IMAGE FORMING DEVICE, IMAGE FORMING METHOD, AND IMAGE FORMING PROGRAM WHICH REQUIRES USER AUTHENTICATION TO START A PRINTOUT PROCESS

(75) Inventors: Kenichi Sawada, Toyohashi (JP); Shoko Haba, Toyokama (JP); Takatsugu Kuno, Hoi-gun (JP); Katsushi Sukigara, Hoi-gun (JP); Atsushi Tomita, Toyohashi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 963 days.

(21) Appl. No.: 12/421,791

(22) Filed: Apr. 10, 2009

(65) Prior Publication Data

US 2009/0257078 A1 Oct. 15, 2009

(30) Foreign Application Priority Data

Apr. 10, 2008 (JP) .................................. 2008-102752

(51) Int. Cl.
- G06K 15/00 (2006.01)
- G06K 1/00 (2006.01)
- G06F 3/12 (2006.01)
- G06F 7/04 (2006.01)
- H04N 1/40 (2006.01)

(52) U.S. Cl. ...................... 358/1.14; 358/1.15; 358/1.16; 358/444; 726/17; 726/26; 726/27

(58) Field of Classification Search .................. 358/1.14, 358/1.15, 448, 468, 1.1, 1.16, 1.13, 1.17, 358/404, 444, 407, 540; 726/5, 17, 26, 27; 713/183

See application file for complete search history.

(56) References Cited

U.S. PATENT DOCUMENTS 6,621,597 B1 * 9/2003 Kuwahara ...................... 358/448
6,978,933 B2 * 12/2005 Yap et al. ....................... 235/451

(Continued)

FOREIGN PATENT DOCUMENTS

| JP | 10-124634 | 5/1998 |
|---|---|---|
| JP | 2000-041122 | 2/2000 |

(Continued)

OTHER PUBLICATIONS

Notification of Reason(s) for Refusal issued in the corresponding Japanese Patent Application No. 2008-102752 dated Apr. 13, 2010, and an English Translation thereof.

(Continued)

*Primary Examiner* — Benny Q Tieu
*Assistant Examiner* — Ngon Nguyen
(74) *Attorney, Agent, or Firm* — Buchanan Ingersoll & Rooney PC

(57) ABSTRACT

An image forming device which is arranged to execute an authentication print job. The image forming device includes: a communication interface unit which receives print data; a job data holding unit which holds job data for the an authentication print job based on the print data; a job execution unit which executes a job based on the job data; an authentication unit; a user authentication unit which outputs a user authentication result; a control unit which instructs a start of execution of the authentication print job to the job execution unit based on the user authentication result; and an instruction generation unit which outputs to the control unit an instruction to change a setting with respect to the authentication print job based on an input of a user authentication result, wherein: the instruction generation unit outputs the instruction to change the setting with respect to an authentication print job in an execution state or an execution queuing state based on the input of the user authentication result that is received in an after user authentication period; and the control unit executes a process of changing the setting based on the instruction.

16 Claims, 21 Drawing Sheets

U.S. PATENT DOCUMENTS

| | | | |
|---|---|---|---|
| 7,224,477 B2 * | 5/2007 | Gassho et al. | 358/1.14 |
| 2002/0041392 A1 | 4/2002 | Tokura | |
| 2005/0105722 A1 * | 5/2005 | Hashimoto | 380/51 |
| 2006/0092453 A1 * | 5/2006 | Okada et al. | 358/1.14 |
| 2007/0127061 A1 | 6/2007 | Itagaki | |

FOREIGN PATENT DOCUMENTS

| | | |
|---|---|---|
| JP | 2001-209696 A | 8/2001 |
| JP | 2002-73198 A | 3/2002 |
| JP | 2002-169682 A | 6/2002 |
| JP | 2006-123415 A | 5/2006 |
| JP | 2006-244372 A | 9/2006 |
| JP | 2006-341404 | 12/2006 |
| JP | 2007-082020 | 3/2007 |
| JP | 2007-156745 | 6/2007 |
| JP | 2007-214853 | 8/2007 |
| JP | 2007-306271 | 11/2007 |

OTHER PUBLICATIONS

Office Action (Notification of Reason(s) for Refusal) dated Jul. 6, 2010, issued in the corresponding Japanese Patent Application No. 2008-102752, and an English Translation thereof.

* cited by examiner

Fig.3

USER AUTHENTICATION / DEPARTMENTAL ADMINISTRATION — 11

USER AUTHENTICATION
- ○ PUBLIC USER (P)
- ● REGISTERED USER (R)

USER NAME (U) — 13

PASSWORD (S) — 15

USER AUTHENTICATION SERVER SETTING

DEPARTMENTAL ADMINISTRATION

DEPARTMENT NAME (D)

PASSWORD (W)

VERIFY

OK | CANCEL | HELP (H) — 17

○ PLEASE SELECT A BOX STORING A DOCUMENT TO BE USED.
A BOX TO BE USED MAY ALSO BE DESIGNATED THROUGH
INPUTTING A BOX NUMBER WITH TEN KEYS.

BOX SEARCH

| SHARED | PERSONAL | SYSTEM |

- BULLETIN BOARD BOX
- POLLING TRANSMISSION BOX
- SECURITY DOCUMENT BOX
- FORCED MEMORY RECEPTION BOX
- FILING NUMBER BOX
- RE-TRANSMISSION BOX
- ENCRYPTION REGISTRATION BOX
- TOUCH & PRINT BOX  23

BOX NUMBER DESIGNATION

2007/12/21  13:10
REMAINING MEMORY 100%

25
CANCEL | OK

DISPLAYING JOBS
DISPLAYING SETTINGS

SELECTED BOX INFORMATION

Y☐ M☐ C☐ K☐

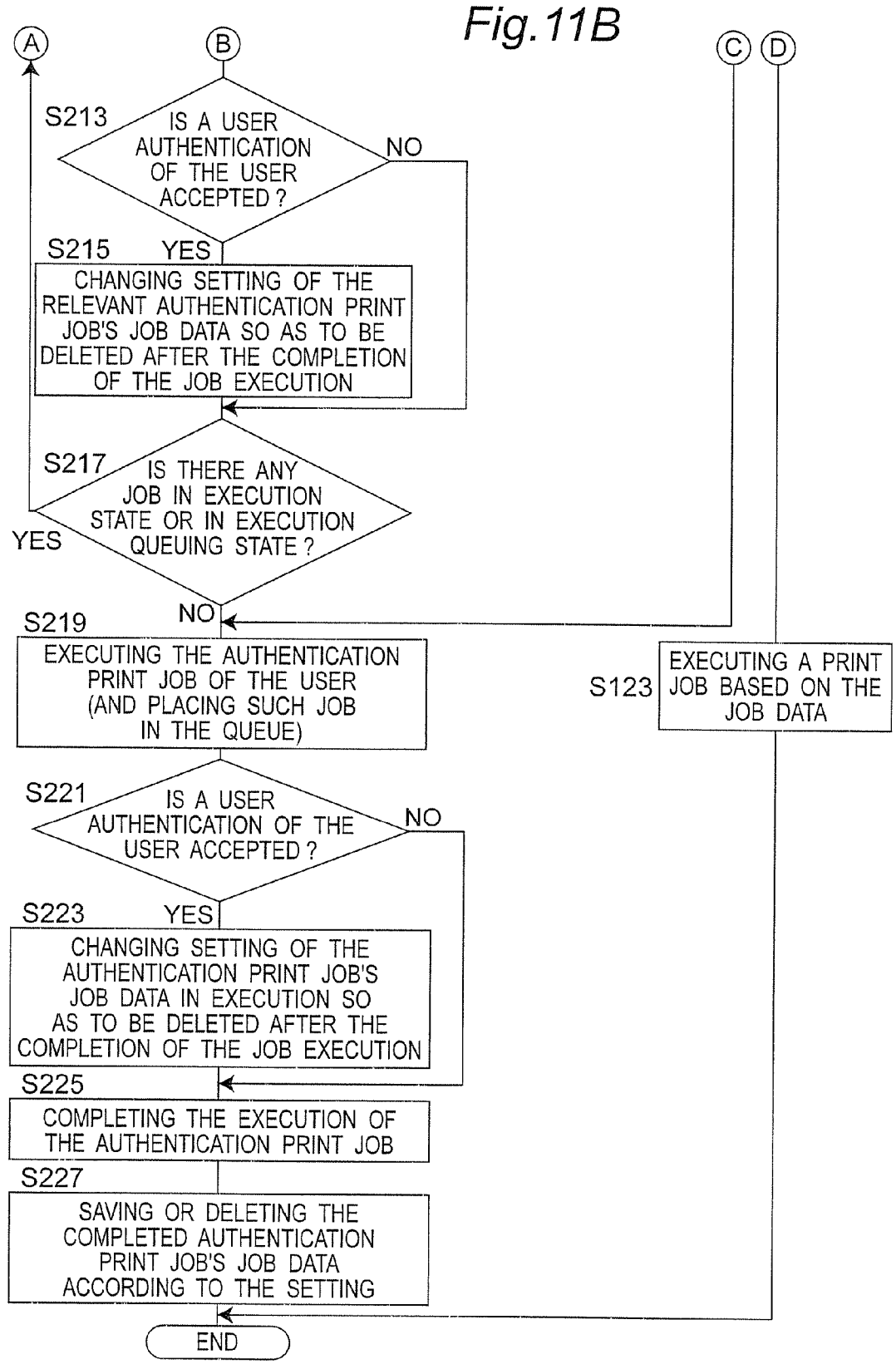

Fig.13

JOB LIST

| USER NAME | JOB NAME | RECEIVED DATE AND TIME | |
|---|---|---|---|
| User-B | JobB1 | 2007/09/01 13:30 | J1 |
| User-A | JobA1 | 2007/09/01 13:20 | J2 |
| User-C | JobC1 | 2007/09/01 13:10 | J3 |
| User-C | JobC2 | 2007/09/01 13:00 | J4 |
| User-A | JobA2 | 2007/09/01 12:50 | J5 |

| JOB ID | JOB NAME | RECEIVED DATE AND TIME | OPERATION FLAG | |
|---|---|---|---|---|
| Job-0001 | JobB1 | 2007/09/01 13:30 | 0 | J1 |
| Job-0003 | JobA1 | 2007/09/01 13:20 | 1 | J2 |
| Job-0003 | JobC1 | 2007/09/01 13:10 | 0 | J3 |
| Job-0004 | JobC2 | 2007/09/01 13:00 | 0 | J4 |
| Job-0005 | JobA2 | 2007/09/01 12:50 | 2 | J5 |

| USER NAME | JOB NAME | RECEIVED DATE AND TIME | |
|---|---|---|---|
| User-B | JobB1 | 2007/09/01 13:30 | J1 |
| User-A | JobA1 | 2007/09/01 13:20 | J2 |
| User-C | JobC1 | 2007/09/01 13:10 | J3 |
| User-C | JobC2 | 2007/09/01 13:00 | J4 |
| User-A | JobA2 | 2007/09/01 12:50 | J5 |
| User-A | JobA3 | 2007/09/01 12:40 | J6 |
| User-B | JobB2 | 2007/09/01 12:30 | J7 |
| User-A | JobA4 | 2007/09/01 12:20 | J8 |
| User-A | JobA5 | 2007/09/01 12:10 | J9 |
| User-C | JobC3 | 2007/09/01 12:00 | J10 |

Fig.20

| USER NAME | JOB NAME | RECEIVED DATE AND TIME |
|---|---|---|
| User-B | JobB1 | 2007/09/01 13:30 |
| User-A | JobA1 | 2007/09/01 13:20 |
| User-C | JobC1 | 2007/09/01 13:10 |
| User-C | JobC2 | 2007/09/01 13:00 |
| User-A | JobA2 | 2007/09/01 12:50 |
| User-A | JobA3 | 2007/09/01 12:40 |

JOB LIST

SORT

IMAGE FORMING DEVICE, IMAGE FORMING METHOD, AND IMAGE FORMING PROGRAM WHICH REQUIRES USER AUTHENTICATION TO START A PRINTOUT PROCESS

This application is based on an application No. 2008-102752 filed in Japan, the contents of which are hereby incorporated by reference.

BACKGROUND OF THE INVENTION

1. Field of the Invention

The present invention relates to an image forming device, an image forming method, and an image forming program executed in the image forming device, in particular to an image forming device, an image forming method, and an image forming program which requires user authentication to start a printout process.

2. Description of the Related Art

In recent years, an image forming device is connected with a plurality of information processing devices by way of a network, and is shared by a plurality of users who use such plural information processing devices. Here, the image forming device includes a digital complex machine (MultiFunction Peripheral (MFP), Scan Print Copy (SPC), or All In One (AIO)) having at least two or more functions of a printer, a facsimile, a copy machine, a scanner, and the like. The information processing device includes a personal computer (PC), and the like. The image forming device and the information processing device are connected so as to be communicable to each other by way of a network such as local area network (LAN) and the Internet, and constitute an image forming system. The image forming system can be constituted by connecting one image forming device to one information processing device at one to one in the minimum configuration. Nowadays, however, a large-scale image forming system is often built up, in which a plurality of image forming devices and a plurality of information processing devices are connected to each other.

In the above-described image forming system, when a user attempts to output a printed material of a desired document from an image forming device, the user specifies a data file of the document by operating the information processing devices, specifies the image forming device to execute the printout of the document, and finally inputs an execute instruction of the printout to the information processing device. The data file of the document mentioned above is a data file stored in a storage region of the image forming system.

The information processing device transmits print data including various data of settings related to the printout process and the content of the document data file to the specified image forming device. The image forming device receives the print data transmitted, creates job data from the print data, and executes a printout process based on the job data created. The printed material of the document is then discharged from a paper discharge tray of the image forming device. The user can then go to the image forming device and collect the discharged printed material of the document.

In the image forming system having above described configuration, the user may not always be near the image forming device at the time point when the printed material of the document is discharged from the image forming device. Rather, since the image forming device is shared by the plurality of users, another user may be near the image forming device. Thus, ensuring information security related to the printed material of the document discharged from the image forming device is a problem in such image forming system.

In relation to such image forming device connected to the network and shared by the plurality of users, an image forming device is proposed in which the user performs user authentication in the vicinity of the image forming device to cause the image forming device to start the execution of the printout process of the document, and the execution of the printout process of the document is started only after the user authentication is successfully completed, in order to ensure information security related to the printed material of the document discharged by the image forming device. In such image forming device, the job data based on the relevant print data is not immediately queued even if the print data requesting for the execution of the printout process is received, but instead, such job data is retained in a temporarily held state. Only after successful completion of the user authentication, of the jobs in the temporarily held state, the job registered by the user who has succeeded the user authentication is queued, and the appropriate printout process is started. Such printout process is well known as "authentication print" or "confidential print."

Plural proposals have already been made for specific user authentication methods. The methods proposed includes: a method of inputting a user name and a password to a device through an inputting means; a method of using an IC card for information for specifying the user to be held as data and an IC card reader; and a method of using a biometrics authentication for identifying the user by using behavioral and physical features of the user. The biometrics authentication is a generic term for the authentication method of identifying and checking an individual by using physical features such as patterns of fingerprint, vein, and iris of an individual, or behavioral features.

The following patent documents will be introduced as document examples disclosing the related art of the present invention.

JP 2001-209696 A discloses an information management method and an information management system. In such information management method, a device managed by an entity that performs information providing service to users and configuring an information management system archives information provided to the users on behalf of the users. The user who receives the provision of the information does not store the provided information in user's device, but instead stores authentication information and the like in the user's device. When the user desires to utilize the provided information, the user sends the authentication information to the device managed by the service entity, and receives and utilizes the information managed by the service entity.

Even in a situation where a plurality of users desire to be provided with same information, the service entity does not archive a plurality of copied materials of the information for each of the plurality of users, but archives only the original of the information.

Therefore, in the information management method of JP 2001-209696 A, waste that arises in the information management system configured by the device of the service entity and the device of the user by storing and managing a plurality of pieces of same information is suppressed, and thus the cost necessary for archiving information is reduced.

JP 2002-169682 A discloses an information processing method, an information processing device, and the like. In the information processing method, the server device can recognize an image processing function and a paper discharge processing function of each of a plurality of connected image processing devices. When receiving from a host computer a request including a printout, the server device analyzes the content of the printout related to the request, determines the image processing device which executes the printout for every page contained in the request by considering the image processing function and the paper discharge processing function of the plurality of connected image processing devices, and sends a printout instruction to the plurality of image processing devices included in such determination. The image processing function here is a function related to a color printout and a monochrome printout.

The information processing method and the like of JP 2002-169682 A thereby realizes an efficient operation of the plurality of image processing devices which are connected to a plurality of host computers by way of the server device.

JP 2006-244372 A discloses an image forming system. The image forming system includes a document processing device, an image forming device, and a portable terminal device. The document processing device is configured to transmit a print job to the image forming device. The print job transmitted from the document processing device may include parameters related to the print job. The parameters include a parameter indicating that the print job is in a secure print mode. The print job in the secure print mode is a print job set so that the execution of the printout is started only after user's operation for authentication. The image forming device which receives the print job determines whether or not the print job is in the secure print mode from the parameters, and holds the print job for a predetermined period if the print job is in the secure print mode. Furthermore, the user can request the image forming device through the portable terminal device to extend the period in which the print job in the secure print mode is held.

Thus, in the image forming system of JP 2006-244372 A, the user can extend the period in which the print job in the secure print mode is held in the image forming device by using the portable terminal device, and thus the relevant print job is prevented from being deleted from the image forming device even if the user cannot execute the print job in the secure print mode before the elapse of the predetermined period.

JP 2002-073198 A discloses an authentication method and an authentication device. In the authentication method, a predetermined authentication device is used for user authentication. The authentication device includes an input unit for accepting input from the user, an input monitoring unit for monitoring the input, and an authentication unit for executing authentication in response to an instruction from the input monitoring unit. The input monitoring unit monitors the input from the user, and determines whether or not the relevant input satisfies a predetermined condition. The input monitoring unit instructs the execution of the authentication (re-authentication) to the authentication unit when determining that the input from the user satisfies the predetermined condition.

In the authentication method of JP 2002-073198 A, the input monitoring unit instructs the execution of re-authentication to the authentication unit when the input from the user satisfies the predetermined condition regarding the user who has once succeeded in the authentication.

The authentication method of JP 2002-073198 A performs the user authentication plural times so as to enhance the accuracy of the authentication itself.

JP 2006-123415 A discloses a printing device, a method of controlling the same, a job processing method, and a printing method. In the printing method, when the print job in the secure print mode in which the printout of plural sets is programmed is input to the printing device, the printing device starts the authentication operation, and outputs the printed material for only the number of sets less than or equal to the above plural sets based on the print job only after the authentication is successfully completed. This printout is a so-called trial printing. The printing device again starts the authentication operation before starting the execution of the printout for the remaining number of sets. In the relevant printing method, the printing device does not start the printout for the remaining number of sets until the authentication is successfully completed.

In the printing method of JP 2006-123415 A, the authentication is again required to the user after the printout related to trial printing is performed. Thus, the security on the printed material is ensured even if the user is away from the printing device between the trial printing and the printing of the remaining number of sets.

The printing method of JP 2006-123415 A has features in that, when the printout process is temporarily interrupted in the process of the printout process executed based on the setting set in the print instruction received by the printing device, the user authentication is thereafter required to resume the temporarily interrupted process based on the setting set in the print instruction. The relevant method does not change the setting set in the print instruction received by the printing device in response to the user authentication performed after the temporary interruption and before resuming. If the user desires to change the setting set in the print instruction input to the printing device, the user has to make an input separately to change the setting after the user authentication is completed.

Thus, the authentication print printout process is an effective processing method for ensuring information security related to the printed material to be discharged.

However, in the conventional authentication print printout process, if, after the authentication print job is input to the image forming device, a user wants to change the setting of the job from the original setting as the job is initially inputted such as a change of the setting related to the number of print sets in the job or a change of the setting so as to delete the data of the job without storing them after the completion of the printout process, the user must first execute procedures for logging into the image forming device so as to have the input unit of the image forming device be in a state of accepting the operation of the user, and, then, he or she needs to input the instruction to change the setting to the image forming device through the input unit. For instance, when the user wants to instruct the image forming device to delete the job of the authentication print after the completion of the printout process, he or she needs to go through the procedures including troublesome operations including: logging into the image forming device by performing the user authentication again; operating the input unit of the image forming device to display a jobs list;→selecting a job to be deleted;→inputting the setting for the deletion of the selected job.

Thus, in the conventional authentication print printout process, if a user wants to additionally make some instructions with respect to the authentication print job after the authentication print job is inputted to the image forming device, he or she is disadvantageously required to perform very troublesome operations, which degrade operability and/or productivity of the image forming device.

Furthermore, in the conventional authentication print printout process, when a plurality of authentication print jobs for one user are held in the image forming device, the plurality of authentication print jobs are collectively processed immediately after the completion of the user authentication, or the user needs to operate the input unit and select the job to be printed out after the completion of the user authentication. In the image forming device adopting the former processing method, a drawback in that even unnecessary printed materials for the user are collectively printed out may arise. Collectively printout processing even the unnecessary printed materials leads to longer execution time of the authentication print job and, at the same time, leads to waste of source. In the image forming device adopting the latter processing method, the user needs to select the job related to the necessary printed material through the input unit of the image forming device after the user authentication. In the image forming device adopting such method, the user cannot automatically acquire the printed material after the user authentication.

SUMMARY OF THE INVENTION

In view of the above problems, it is an object of the present invention to provide an image forming device, a method of image formation in the image forming device, and a program for image formation. The operability and the productivity of the image forming device are enhanced while a security related to an authentication print job being ensured to the same extent as that in the conventional image forming device.

In one aspect, the present invention relates to an image forming device which is arranged to execute an authentication print job being a print job in which a user authentication is performed using a predetermined authentication device and a start of execution of a printout process is determined based on a result of the user authentication. The image forming device includes: a communication interface unit which is arranged to receive print data related to a print job; a job data holding unit which is arranged to hold job data for an authentication print job based on the print data; a job execution unit which is arranged to execute a job based on the job data; an authentication unit which is the predetermined authentication device; a user authentication unit which is arranged to output a result of the user authentication using the authentication unit; a control unit which is arranged to control operations of the job execution unit so as to instruct a start of execution of the authentication print job to the job execution unit based on the user authentication result outputted by the user authentication unit; and an instruction generation unit which is arranged to output to the control unit an instruction to change a setting with respect to the authentication print job based on an input of a user authentication result, wherein: the instruction generation unit outputs to the control unit the instruction to change the setting with respect to at least one authentication print job in at least one of an execution state and an execution queuing state based on the input of the user authentication result that is received in an after user authentication period being a period in which the at least one authentication print job of the user who relates to the input of the user authentication result is in at least one of the execution state and the execution queuing state at the job execution unit; and the control unit executes a process of changing the setting with respect to the authentication print job based on the instruction.

In another aspect, the present invention relates to an image forming method in an image forming device which is arranged to execute an authentication print job being a print job in which a user authentication is performed using a predetermined authentication device and a start of execution of a printout process is determined based on a result of the user authentication. The image forming method comprising: receiving print data related to a print job by a communication interface unit; holding job data for an authentication print job based on the print data by a job data holding unit; outputting a result of the user authentication using an authentication unit being the predetermined authentication device by a user authentication unit; controlling operations of a job execution unit by a control unit so as to instruct a start of execution of the authentication print job based on the user authentication result outputted by the user authentication unit; executing the job based on the job data by the job execution unit; outputting to the control unit an instruction to change a setting with respect to the authentication print job based on an input of a user authentication result that is received in an after user authentication period by an instruction generation unit, the after user authentication period being a period in which at least one authentication print job of the user who relates to the input of the user authentication result is in at least one of an execution state and an execution queuing state at the job execution unit; and executing a process of changing the setting related to the at least one authentication print job based on the instruction by the control unit, wherein: the outputting by the instruction generation unit includes outputting to the control unit the instruction to change the setting with respect to the at least one authentication print job in at least one of the execution state and the execution queuing state based on the input of the user authentication result that is received in the after user authentication period.

In still another aspect, the present invention relates to a computer readable medium storing an image forming program executable by a computer of an image forming device which is arranged to execute an authentication print job being a print job in which a user authentication is performed using a predetermined authentication device and a start of execution of a printout process is determined based on a result of the user authentication. The image forming program includes: code which causes a communication interface unit to receive print data related to a print job; code which causes a job data holding unit to hold job data for an authentication print job based on the print data; code which causes a user authentication unit to output a result of the user authentication using an authentication unit being the predetermined authentication device; code which causes a control unit to control operations of a job execution unit so as to instruct a start of execution of the authentication print job based on the user authentication result outputted by the user authentication unit; code which causes a job execution unit to execute the job based on the job data; code which causes an instruction generation unit to output to the control unit an instruction to change a setting with respect to the authentication print job based on an input of a user authentication result which is received in an after user authentication period, the after user authentication period being a period in which at least one authentication print job of the user who relates to the input of the user authentication result is in at least one of an execution state and an execution queuing state at the job execution unit; and code which causes the control unit to execute a process of changing the setting related to the at least one authentication print job based on the instruction, wherein the code which causes the instruction generation unit to output includes a function which outputs to the control unit the instruction to change the setting with respect to the at least one authentication print job in at least one of the execution state and the execution queuing state based on the input of the user authentication result which is received in the after user authentication period.

According to the present invention, an image forming device in which the security related to an authentication print job is ensured to the same extent as that in the conventional image forming device, and in which operability and productivity with respect to an authentication are enhanced is provided.

According to the image forming device of the present invention, the operability of the image forming device after a user authentication for the authentication print is successfully completed is improved with respect to the authentication print job, and thus the productivity of image formation using the image forming device is enhanced.

Other objects and further features of the present invention will be apparent from the following detailed description when read in conjunction with the accompanying drawings.

BRIEF DESCRIPTION OF THE DRAWINGS

FIG. 3 is an exemplary diagram of a user interface of a printer driver;

FIG. 4 is an exemplary diagram of the user interface of an image forming device;

FIG. 11B is a flowchart of the process executed by the MFP 1;

FIG. 13 is a display example of a job list;

FIG. 14 is an exemplary diagram of a job management table 93;

FIG. 19 is an example of a result of a search process in step S203;

FIG. 20 is a display example of a job list; and

DETAILED DESCRIPTION OF THE PREFERRED EMBODIMENTS

The embodiment according to the present invention relates to an image forming device, a method of image formation used in the image forming device, and a program for image formation.

The image forming device according to the embodiment of the present invention is an image forming device capable of executing "authentication print" printout process.

<Regarding "Authentication Print (Authentication & Print)" Printout Process>

Prior to specifically describing the embodiment of the present invention, the "authentication print (authentication & print)" printout process will be briefly described with reference to FIGS. 1 to 5. When the image forming device executes a job involving a printout process, the "authentication (&) print" printout process refers to a printout mode in which the image forming device performs user authentication using a predetermined authentication means, and starts the printout of the relevant job only after the user authentication is successfully completed.

Figure 1:
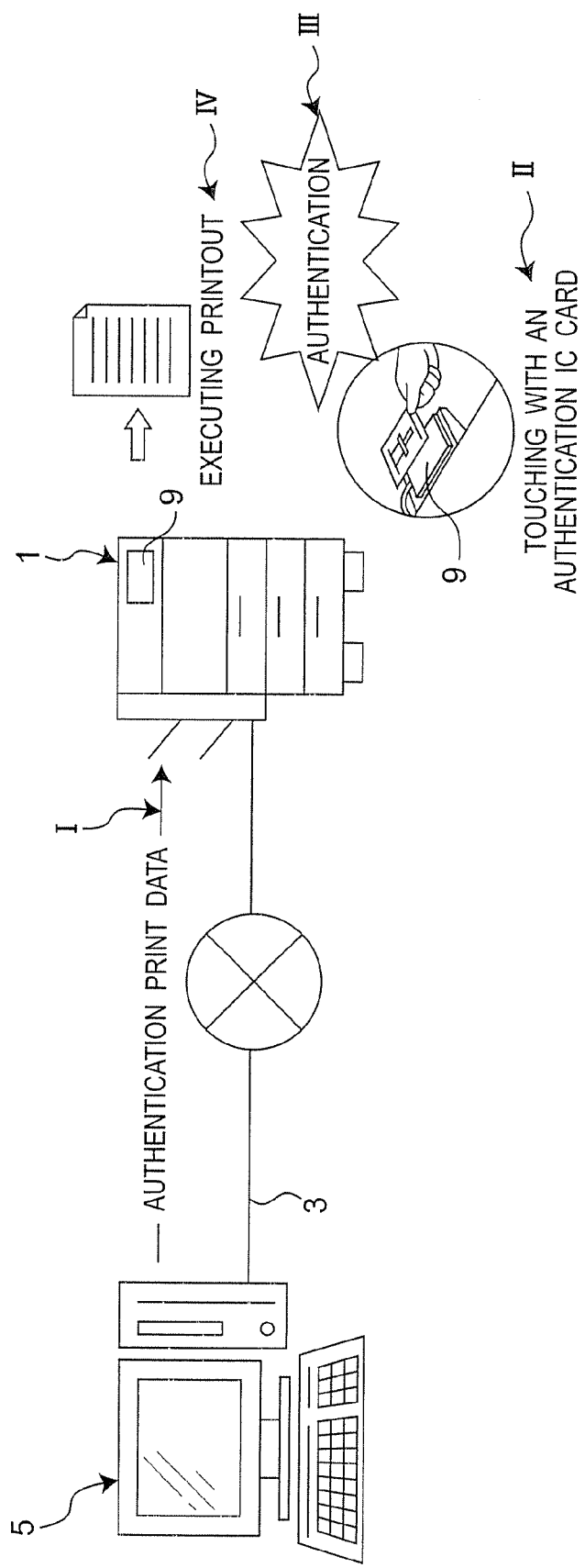
FIG. 1 is a schematic diagram of a procedure of the authentication print.
Figure 2:
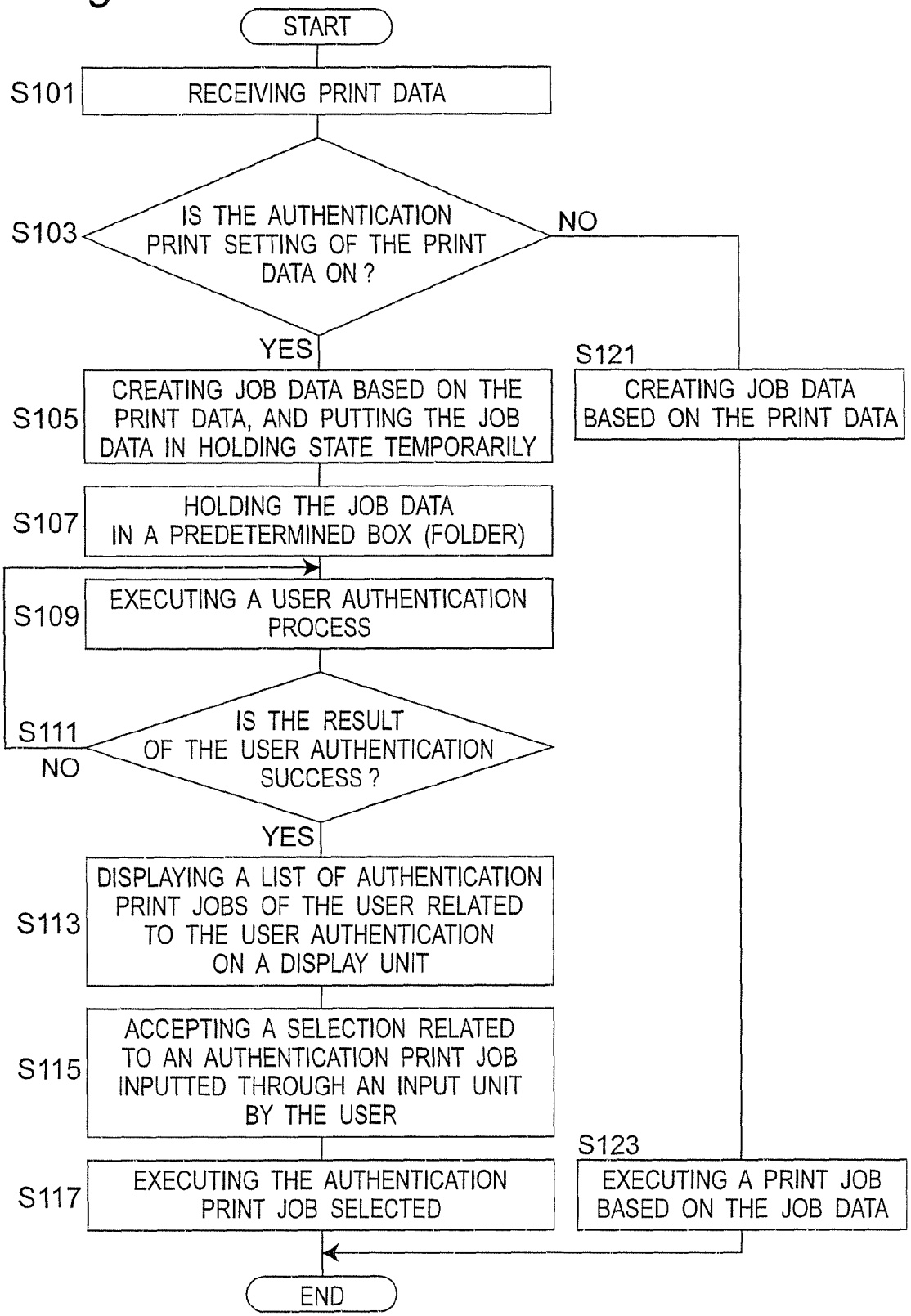
FIG. 2 is a flowchart of an authentication print printout process.

FIG. 1 is a schematic diagram of a situation where an MFP 1 executes the authentication print printout process based on authentication print data created in an information processing device (personal computer (PC)) 5 and transmitted to the image forming device (digital complex machine (MFP)) 1 through a network 3. In FIG. 1, the situation where the MFP 1 executes the authentication print printout process is roughly divided into four phases, the four phases being indicated as I, II, III, and IV. FIG. 2 is a flowchart of a process on the print data by the MFP 1 after receiving the print data. FIG. 3 is an exemplary diagram of a user interface 11 of a printer driver/software provided when creating the print data to be transmitted to the MFP 1 in the PC 5.

A user uses user interface 11 of the printer driver/software shown in FIG. 3 to create the print data of the authentication print in the PC 5. The user interface 11 has a user name and a password as items for user authentication. The user inputs a user name to a user name text box 13 to give the user name to the print data. In addition, the user can input a password, as necessary, to a password text box 15. Thereafter, the user pushes an OK button 17. With reference to FIG. 1, the PC 5 recognizes the pushing of the OK button 17, and transmits the print data related to the authentication print job to the MFP 1 (phase I of FIG. 1). The authentication data necessary for the user authentication in the image forming device such as the MFP 1 is held in advance as one part of the information related to the user in a state accessible by the MFP 1 within a predetermined storage region.

The phase I (FIG. 1) is related to step S101 of FIG. 2. In step S101 (FIG. 2), the MFP 1 receives the print data transmitted through the network from the PC 5.

In step S103 (FIG. 2), the MFP 1 analyzes the received print data, and determines whether or not the setting related to the authentication print is turned ON. If the MFP 1 determines that the setting related to the authentication print of the relevant print data is turned ON ("YES" in step S103), the process proceeds to step S105. If the MFP 1 determines that the setting related to the authentication print of the relevant print data is not turned ON (turned OFF), ("NO" in step S103), the process proceeds to step S121. The processes executed by the MFP 1 in step S121 and step S123 include only an extremely general processing content related to the normal (i.e., not authentication print) printout process, and thus the description thereof will be omitted herein.

In step S105 (FIG. 2), the MFP 1 creates the job data (authentication print job data) based on the received print data, and holds the authentication print job data in a temporarily stored state. Thus, in the authentication print printout process, the MFP 1 does not immediately queue the job data related to the job even when accepting the registration of the job.

In step S107 (FIG. 2), the MFP 1 holds the relevant job data as job data of the authentication print job in a temporarily stored state in a predetermined box (a folder so-called) until the user performs user authentication using a predetermined authentication device. The box is a storage region for saving job data and various data. Physically, the storage region is set in a hard disk drive arranged in the MFP 1. FIG. 4 is a diagram of a display example of a display unit 21 of the user interface of the MFP 1. The job data for the authentication print job is held in a touch & print box 23 shown in FIG. 4. The user having a predetermined authority can select the touch & print box 23 and push an OK button 25 to reference a list of authentication print jobs held in the box 23, or select a job.

FIG. 1 is again referenced. The user executes the user authentication (phase II of FIG. 1) by touching an authentication IC card storing authentication data to an authentication unit 9 of the MFP 1. The phase II (FIG. 1) is related to step S109 of FIG. 2. In step S109 (FIG. 2), the MFP 1 executes a user authentication process. Here, the user authentication is a user authentication on a user who registered the relevant job. The user authentication process includes a process of reading out, for example, authentication data from the authentication IC card, and checking the authentication data held in advance and the authentication data read out from the IC card with the user name as a key, and a process of determining success/failure of the user authentication.

The phase III of FIG. 1 shows a situation where the relevant user authentication is successfully completed, and this phase III (FIG. 1) is relevant to step S111 (FIG. 2). In step S111, the MFP 1 determines whether the result of the user authentication is success or fail. If the MFP 1 determines that the result of the user authentication is a success ("YES" in step S111), the process proceeds to step S113. If the MFP 1 determines that the result of the user authentication is a fail ("NO" in step S111), the process returns to step S109. The phase III (FIG. 1) corresponds to "YES" in step S111 (FIG. 2).

Figure 5:
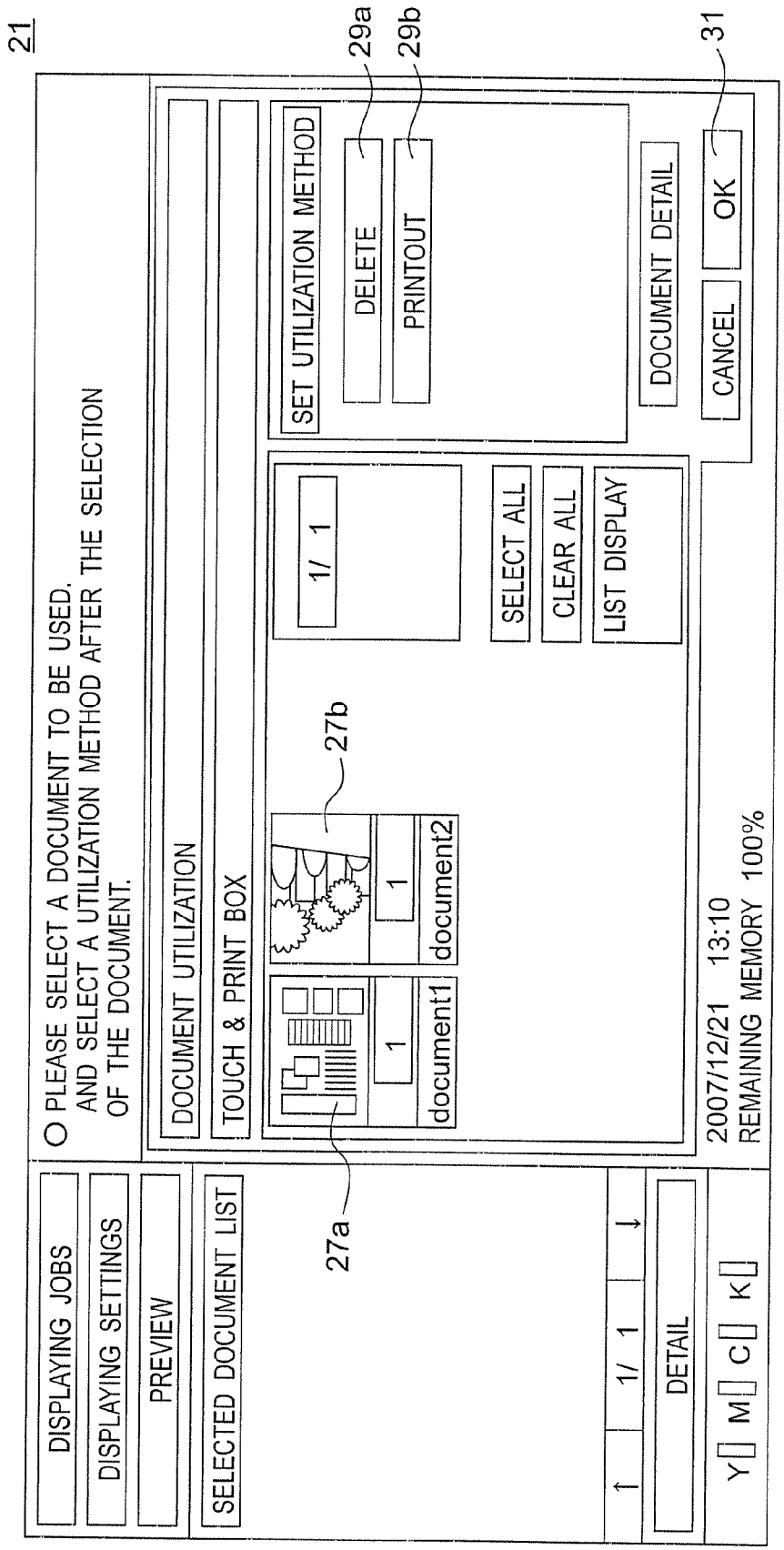
FIG. 5 is an exemplary diagram of the user interface of the image forming device.

In step S113 (FIG. 2), the MFP 1 displays a list of authentication print jobs of the user related to the user authentication on the display unit 21 of the user interface. FIG. 5 is a diagram of a display example of the display unit 21 in step S113. The information of the authentication print job to which the user name of the user who succeeded in the user authentication is given is displayed on the display unit 21. (In the present example, thumbnails 27a and 27b of a document related to two authentication print jobs are displayed). In addition to the thumbnails 27a and 27b, buttons (delete button 29a and print button 29b) for the user to select the process to execute on the authentication print job, an OK button 31, and the like are displayed on the display unit 21.

In step S115 (FIG. 2), the MFP 1 accepts the input from the user through the input unit of the user interface. In the present example, the display unit 21 shown in FIG. 5 is configured by a liquid crystal touch panel, and also serves as an input unit. In the present step, the user selects the document to print, pushes the print button 29b, and lastly pushes the OK button 31.

The MFP 1 may collectively printout process all the authentication print jobs given the user name of the user related to the user authentication in place of steps S113 and S115.

In step S117 (FIG. 2), the MFP 1 executes the printout process on the selected authentication print job. The phase IV (FIG. 1) shows a situation where the MFP 1 executes step S117 (FIG. 2) so the printed material of the document is discharged.

Therefore, the MFP 1 (image forming device) continues to hold the authentication print job data in the temporarily stored state, and, after confirming the success of user authentication, changes the relevant data to an execution state or an execution queuing state (execute process of queuing the data).

The MFP 1 processes the authentication print job data through a method set in advance after the printout process related to the authentication print is completed. The method set in advance is a process of saving the authentication print job data, which printout process is completed, in a predetermined box (e.g., touch & print box 23).

Therefore, the authentication print printout process differs from the "normal" printout process in that the printout process does not start until the user authentication using a predetermined authentication means is successful. The authentication print is also referred to as touch & print.

When deleting the job data related to the authentication print job from the MFP 1 or moving the job data to a desired box after the authentication print job is completed, the user again logs into the MFP 1, sets the input unit of the user interface of the MFP 1 in an operable state, then selects the touch & print box 23 of the display unit 21 shown in FIG. 4, and inputs instructions such as select, delete, move between boxes the job data to the MFP 1. In the login process to the MFP 1, operations such as user authentication using the authentication IC card and/or input of user name and password through the input unit are usually requested on the user.

Preferred embodiments of the present invention will be described below with reference to the accompanied drawings.

First Embodiment

In the image forming device (MFP) according to the first embodiment of the present invention, when receiving the user authentication (second and subsequent user authentication) by the user related to the authentication print job in execution or in execution queuing within a predetermined period, that is, during a period from a point when the user authentication using a predetermined authentication device for starting the execution of the authentication print job is successfully completed to a point when the execution of the authentication print job is completed, for example, or, in other words, from a point when the state of the authentication print job is changed from the temporarily stored state to the execution state or the execution queuing state (queued state) to the point when the execution of the authentication print job is completed, a process for changing settings from the settings as the print date were received to another settings can be executed with respect to the settings with respect to the authentication print job in the execution or in the execution queuing. The relevant settings are the settings with respect to content of a process to the authentication print job data of which the authentication print job has been completed. For instance, in the image forming device (MFP) according to the first embodiment of the present invention, the settings can be changed, according to the second and/or subsequent user authentication, from the setting where the job data after the completion of the job are saved in the predetermined box to the setting where the relevant job data are deleted immediately after the completion of the job.

According to such configuration, in the image forming device according to the first embodiment of the present invention, the user can change the settings set with respect to the authentication print job with only the user authentication operation of simply touching the IC card and the like to the predetermined authentication device without being required the troublesome operation such as the operation of logging in and the operation of selecting the job through the input unit with respect to the authentication print job in execution or in execution queuing.

Obviously, the image forming device according to the present invention can execute the printout process that is not the "authentication print," that is, the "normal" printout process. In the "normal" printout process, the image forming device creates job data with respect to the input print data, and immediately executes the printout process. The switch between the "authentication print" and the "normal" printout processes can be switched in units of jobs based on the set parameter value included in the print data. This switching may be carried out based on the information separately input to the image forming device in place of or in addition to the set parameter value included in the print data.

In the embodiments illustrated below, the print data is inputted to the image forming device from the external information processing device via a network. The parameter setting for causing the imaging forming device to perform the "authentication print" with respect to the job related to the print data is carried out by having the user set the predetermined parameter at the external information processing device. The contents of other settings may be set to the print data by being set at the external information processing device by the user or complying with the content of the setting set in advance.

However, in the present invention, the methodology for inputting the print data to the image forming device is not limited to the methodology of inputting through the network, as described above. Other inputting methodologies include a methodology in which a user directly registers the job to the image forming device, a methodology in which a user registers the job to the image forming device by using, for example, a portable storage medium, and the like.

Figure 6:
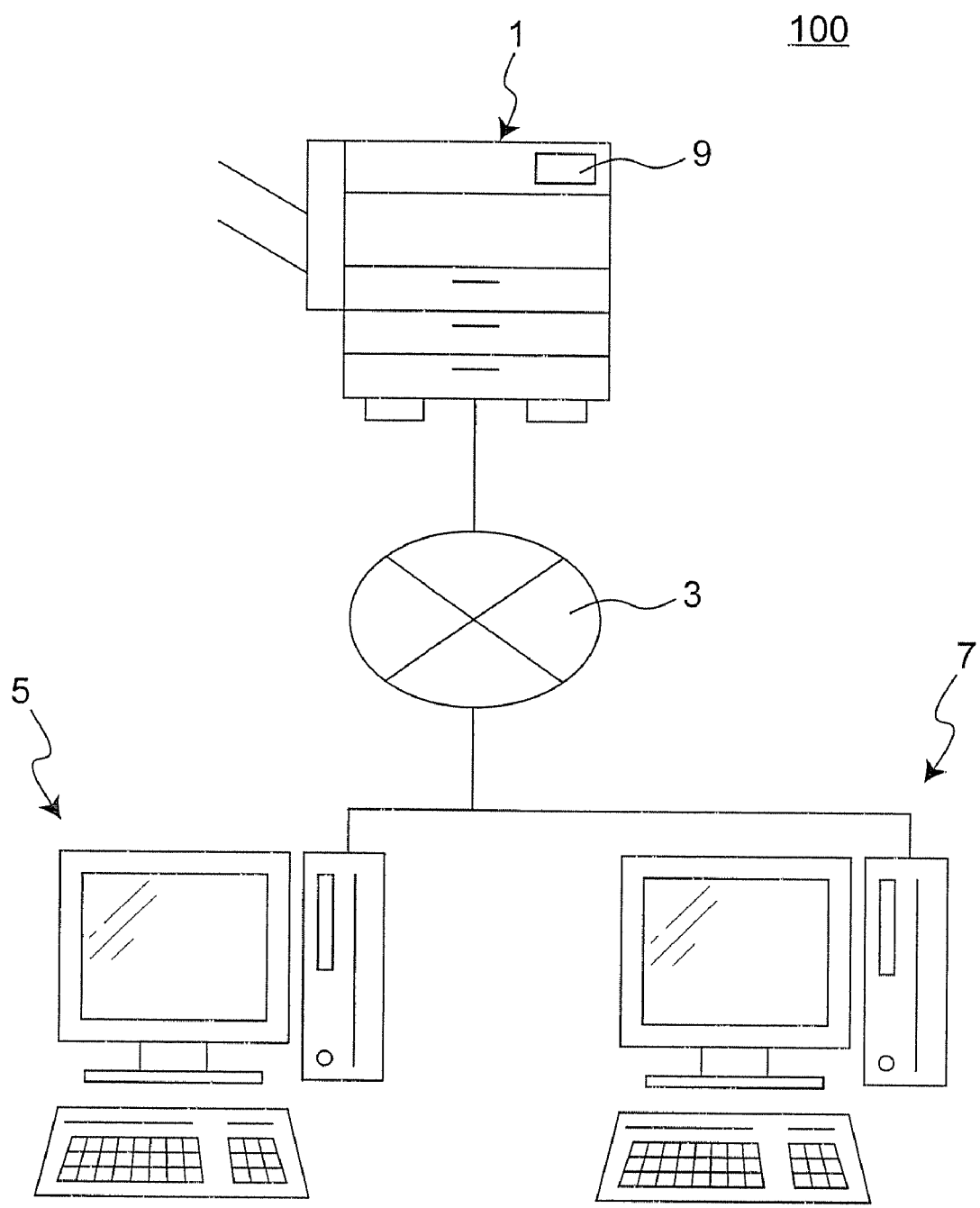
FIG. 6 is a schematic diagram of a configuration of an image forming system 100.

FIG. 6 is a schematic diagram of a configuration of an image forming system 100 according to the first embodiment of the present invention.

<Image Forming System>

The image forming system 100 includes a digital complex machine (MFP) 1 as the image forming device, and a plurality of information processing devices (personal computers (PC)) 5, 7 as terminal devices of the image forming device 1. The MFP 1 and the plurality of PCs 5, 7 are communicably connected to each other by way of a network 3. The network 3 may be the Internet, a local area network (LAN), or the like. The network 3 may be any one of a network using a dedicated line, a network using a general line, or a network using a wireless communication path; or a network configured of a combination of at least two of the above.

The digital complex machine 1 configures the image forming device according to the first embodiment. The digital complex machine (MFP) is an image forming device intensively having a plurality of functions such as print function, copy function, scanner function, facsimile function, e-mail transmission function, and the like. The MFP 1 forms a document image scanned in the MFP 1 or the image generated from the print data received via the network 3 on a printing medium such as paper. Here, the print data is data including the drawing command that can be processed by the MFP 1 and the data of the document to be printed, generated by having the printer drive process the drawing command issued by an operating system or the application program executed on the terminal device such as the PC 5. The drawing command contained in the print data may be described by a page description language that can be processed by the MFP 1. Furthermore, the data of the document may be a data file of a document having a file format such as PDF (Portable Document Format), TIFF (Tagged Image File Format), JPEG (Joint Photographic Experts Group), XPS (XML Paper Specification), and the like. The MFP 1 can provide the image data obtained by scanning the image in the MFP 1 to other equipment via the network 3. The MFP 1 includes an authentication unit 9 in its own machine as a predetermined authentication means for performing user authentication in the authentication print printout process.

The image forming device according to the present embodiment merely needs to be an image forming device capable of receiving print data transmitted from a terminal device via a network, generating job data based on the print data, and executing printout process. The authentication unit 9 does not necessarily need to be incorporated in the MFP 1 body. The authentication unit 9 may be connected to the MFP 1 and arranged in the vicinity thereof.

The specific configuration of the authentication unit 9 may be appropriately selected so as to adapt to the methodology of user authentication performed in the MFP 1. The authentication unit 9 is, for example, an IC card reader. The authentication unit 9 may also be touch panel to which the user name and the password can be input. In this case, the user interface of the MFP 1 may also have the function of the authentication unit. Alternatively, the authentication unit 9 may be a biometric device. The biometric device measures physical features of an individual such as fingerprint, palm print, vein pattern, iris, retina, voice print, face form and ear form, or behavior features of an individual such as handwriting and key stroke, compares the same with information registered beforehand, and identifies the individual.

The personal computers 5 and 7 respectively configure the terminal devices (information processing devices) according to the first embodiment of the present invention. The personal computers 5 and 7 are respectively general computer devices each including a central processing unit (CPU), a main storage device (ROM, RAM), an auxiliary storage device (HDD), and an input/output device (display, keyboard, and mouse). The user creates print data by using the PC 5, and transmits the print data to the MFP 1 via the network 3.

The terminal device according to the present embodiment does not need to be an information processing device having versatility such as a personal computer. A device capable of instructing the printout of the document to the image forming device suffices as the terminal device of the present embodiment.

The image forming system 100 may also include a server device (not shown).

The server device here is, for example, an authentication server. The authentication server is a server having a function of checking user identification information (e.g., user ID) and user authentication information (e.g., password, authentication data) transmitted from a client (e.g., MFP 1 and PC 5) with user information and user authentication information of the server device, determining success/fail of the user authentication, and returning the determination result to the client. The authentication server realizes the function of a user authentication unit 79 (FIG. 10) of the MFP 1. In this case, the user authentication unit 79 (FIG. 10) can be omitted in the MFP 1.

The server device is, for example, a data server. The data server is a server device having a function of holding data file of a document or data (print data) of a job to be transmitted to the MFP 1 or job data which should have been held in the MFP 1, and the like, and transmitting the data file of the document, the print data, the job data and the like in response to a request from the client.

The server device (not shown) is not an essential element of the image forming system 100. The MFP 1 and the PC 5 or 7 configuring the image forming system may have the function of the server, as necessary.

<Hardware Configuration of Image Forming Device>

Figure 7:
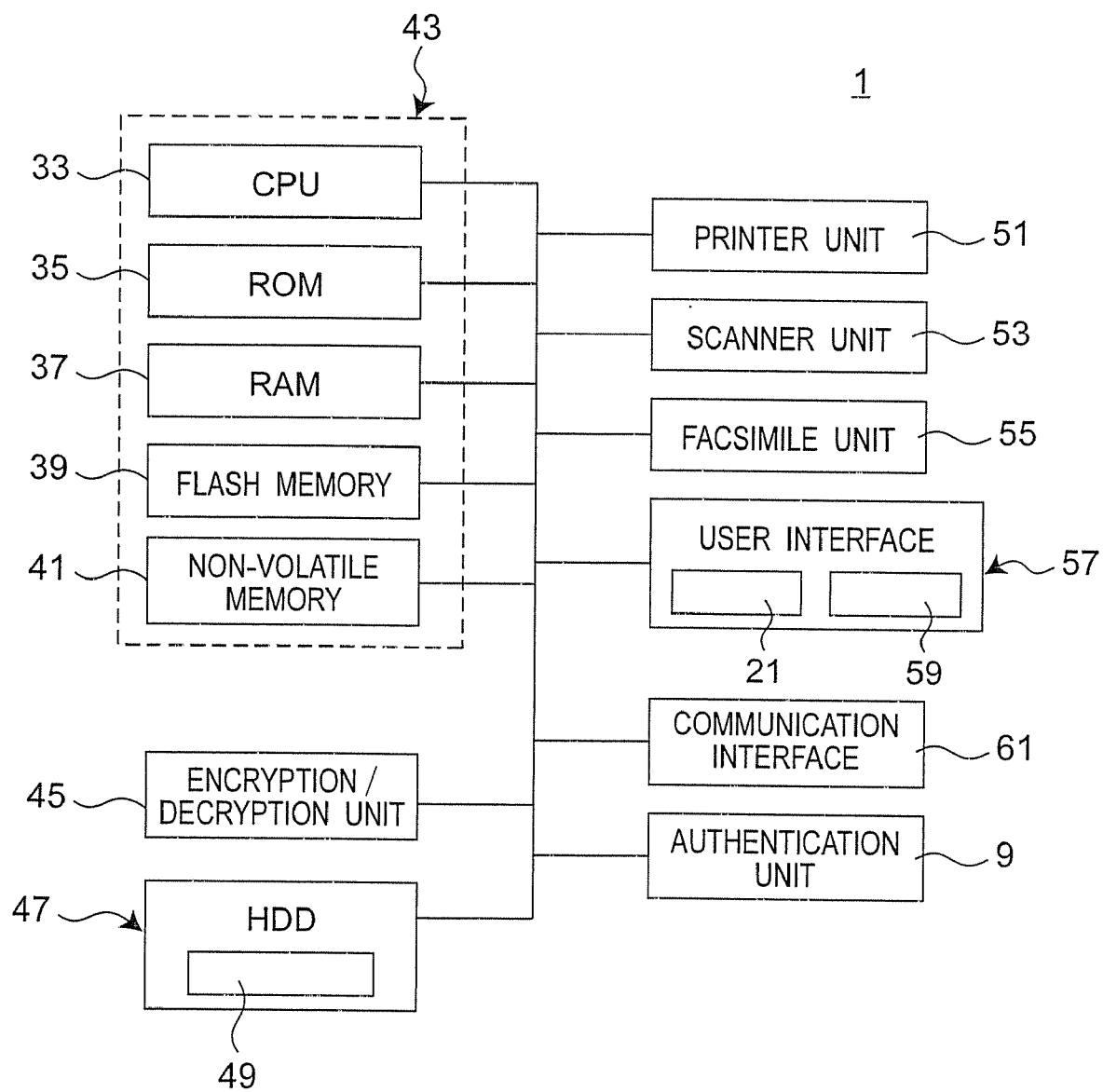
FIG. 7 is a block diagram of a hardware configuration of an MFP 1.

FIG. 7 is a block diagram of a hardware configuration of the MFP 1.

The MFP 1 includes: a central processing unit (CPU) 33; a read only memory (ROM) 35; a random access memory (RAM) 37; a flash memory 39; a non-volatile memory (NVRAM) 41; an encryption/decryption unit 45; a hard disk drive (HDD) 47; a box 49 in the HDD 47; a printer unit 51; a scanner unit 53; a facsimile unit 55; a user interface 57; a display unit 21 and an input unit 59 of the user interface 57; a communication interface 61; and the authentication unit 9. Such components are connected to each other by way of a data bus in the MFP 1.

The CPU 33 executes an image forming program held in the ROM 35, the RAM 37, the flash memory 39, the NVRAM 41, or the HDD 47, or an image forming program provided through the communication interface 61, and processes data held in the ROM 35, the RAM 37, the flash memory 39, the NVRAM 41, or the HDD 47. The CPU 33, the ROM 35, the RAM 37, the flash memory 39, and the NVRAM 41 configure a computer main part 43 capable of executing the image forming program. The image forming program is executed in the main part 43, and thus the main part 43 has a function of controlling the MFP 1, a function of executing the arithmetic process, and a function of holding the data. The image forming program executed on the MFP 1 thus realizes the technical idea of the present invention. The image forming program may be installed in the flash memory 39 and the like of the MFP 1 in advance. Alternatively, the image forming program may be provided to the MFP 1 through a storage medium such as a flexible disk (FD), an optical disk, or a USB memory, or through communication means such as the Internet.

The main part 43 has a function of controlling the entire MFP 1, and realizes the functions of copy, print, scan, and facsimile. The CPU 33 can execute various control programs as necessary in addition to the image forming program of the present invention.

The ROM 33, the RAM 35, the flash memory 39, the NVRAM 41, and the HDD 47 are storage devices for holding data and a program. The MFP 1 appropriately uses such storage devices, and holds necessary data and program.

In the MFP 1 according to the first embodiment, various MFP control programs and image forming programs are held in the flash memory 39. The flash memory 39 also holds data of messages by various country languages to be displayed on the display unit 21 to respond to the input from the input unit 59 or the communication interface 61, and an operating system (OS) for incorporating equipment such as VxWorks.

The RAM 35 configures a so-called working memory of the MFP 1. The RAM 35 may be configured by SRAM, SDRAM, DRAM, and the like.

The NVRAM 41 is a storage device for holding various settings associated with image formation. The NVRAM 41 holds various data (network set value data such as IP address, set value data of image quality adjustment function etc.) necessary in the operation of the MFP 1.

The encryption/decryption unit 45 encrypts data written to the HDD 47, and decrypts the encrypted data read out from the HDD 47. The encryption/decryption unit 45 may be configured as a dedicated integrated circuit substrate.

In the MFP 1 according to the first embodiment, the hard disk drive (HDD) 47 being a fixed storage device is arranged as an auxiliary storage device. The HDD 47 holds image data and job data in its large-capacity storage region. The HDD 47 includes a region where data are swapped for the data exceeding the capacity of the RAM 37. In the MFP 1, a password can be set for reading/writing of the data from/to the HDD 47 (password protective function (HDD lock function)). Furthermore, the HDD 47 includes a region (box 49) for storing various data such as received print data and job data created from the print data by the MFP 1. The job data related to the authentication print job is also held in the box 49. In addition, the box 49 includes a personal box of which utilization authority is given to each of users. The HDD 47 can further hold authentication information necessary for user authentication.

The printer unit 51 receives image data and executes printout. The printer unit 51 forms an image on a printing medium such as paper. The printing medium subjected to the image formation is discharged from the printer unit 51 as printed material. The printer unit 51 may include a finisher (not shown) for performing finishing process such as sort processing, hole punching process, and staple processing on the discharged printed material.

The scanner unit 53 can photoelectrically read (scan) the information recorded on a paper medium and the like, and output the image data of the relevant information. The scanner unit 53 may include an auto document feeder (ADF) for automatically and continuously scanning a plurality of sheets of a document, and a device having a Duplex function being the function related to double-sided scan.

The facsimile unit 55 transmits and receives facsimile data via a public line.

The user interface 57 is an unit which carries out input/output of information between the MFP 1 and a user, and is a dedicated device for the user to operate the MFP 1.

The user interface 57 includes the display unit 21 for presenting information to a user, and the input unit 59 for accepting input of information from a user. The user interface 57 of the MFP 1 has a liquid crystal touch panel, which integrally configures the display unit 21 and the input unit 59. The input unit 59 includes a software key displayed on the liquid crystal touch panel, as well as, a hardware key such as a ten key, a start key, a stop key, and a key for switching a display of a screen. When executing the user authentication for the authentication print based on the information that can be inputted via the user interface 57 (e.g., key input of user name and password), the user interface 57 configures the predetermined authentication means for the authentication print printout process.

The communication interface 61 is an interface for transmitting and receiving data between the MFP 1 and an external device.

The communication interface 61 is an interface for Ethernet (registered trademark) connecting the MFP 1 to a network such as LAN. In this case, the communication interface 61 supports the standard of 10 BASE-T, 100 BASE-T or the like.

For instance, the communication interface 61 is a USB port. The authentication unit 9 can be connected to this USB port. The MFP 1 and the PC 5 may be locally connected through this USB port.

In addition, the communication interface 61 may be an interface for connecting the MFP 1 and the PC 5 by means of a serial communication method (RS-232C standard). The communication interface 61 may connect the MFP 1 with the authentication unit 9 by means of the serial communication method.

Furthermore, the communication interface 61 may include a Centronics interface (parallel port). The MFP 1 and the PC 5 may be locally connected through this Centronics interface.

The authentication unit 9 is an information input device used for the user authentication for starting the execution of the printout process of the authentication print printout process. The authentication unit 9 configures a predetermined authentication means for the authentication print printout process of the embodiment of the present invention.

Figure 8:
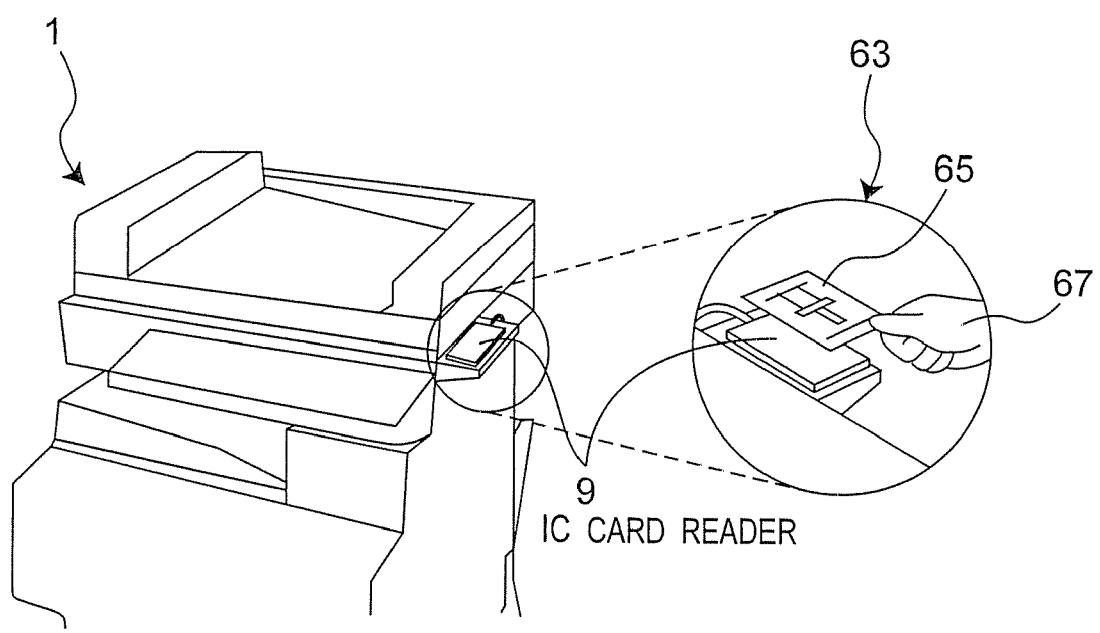
FIG. 8 is an exemplary diagram of an authentication unit 9.

FIG. 8 is a diagram describing the authentication unit 9 arranged in the MFP 1 of the embodiment of the present invention. As apparent with reference to a partially enlarged region 63, the authentication unit 9 is an IC card reader 9 for reading out information recorded on an IC card (smart card) 65 held by the user 67. For instance, the IC card and the IC card reader may be configured using the technique of a well-known RFID (Radio Frequency Identification) technology.

The predetermined authentication means applicable to the embodiment of the present invention is not limited to the authentication unit 9 (IC card reader 9). As described above, the user interface 57 may be used as the predetermined authentication means. In the present invention, one MFP 1 may also include a plurality of types of device as the predetermined authentication means.

The MFP 1 according to the embodiment of the present invention may also include a biometric authentication device as the authentication unit 9. The biometric device can determine the biometric quantity such as the fingerprint of the user. In this case, the user can cause the MFP 1 to start the execution of the user authentication process by touching the biometric device with his/her finger.

<Software Configuration of Image Forming Device>

The configuration of various control programs and the like of the MFP 1 will now be described.

Figure 9:
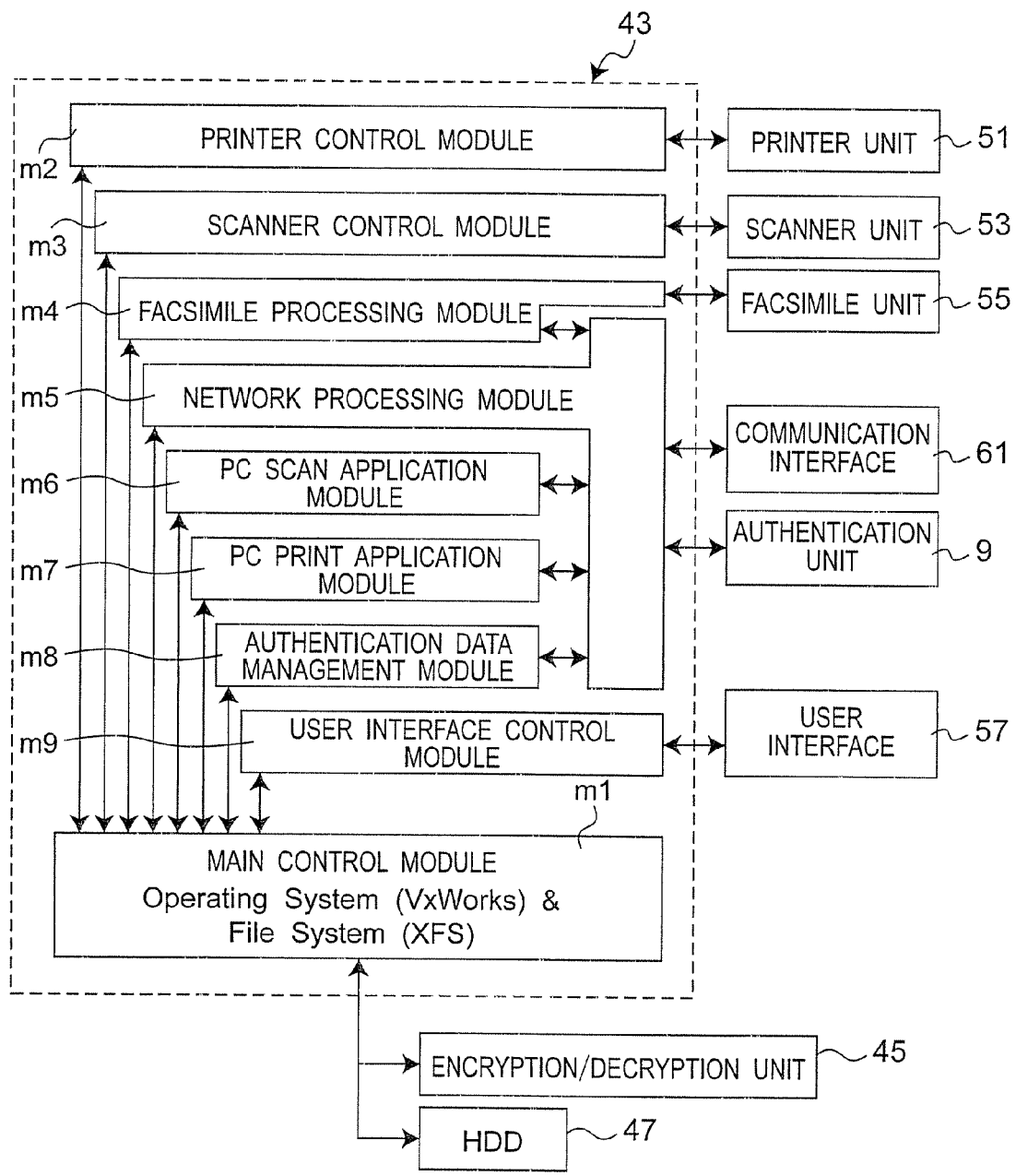
FIG. 9 is a block diagram of a software configuration of the MFP 1.

FIG. 9 is a block diagram of one example of various control programs (m1 to m9) held by the flash memory 39 of the MFP 1. The various control programs include a plurality of modules (m1 to m9) executable in the computer main part 43 of the MFP 1. The main control module m1 of the plurality of modules is a module constituting the core of the entire control of the MFP 1. The remaining modules m2 to m9 are modules for controlling the hardware components and the like of the MFP 1.

Each module (m1 to m9) includes an interface with the hardware component shown in FIG. 7, and executes control of such hardware components, transmission/reception of data, and processing of data.

The main control module m1 comprehensively controls the generation of a job execute instruction in the remaining modules (m2 to m9). The main control module m1, for example, controls all processing of each module such as scan operation process and print operation process including start, stop, resume, discard, interruption, and the like of the copy job in the execution control of the copy job. The main control module m1 can execute processing in time of activation of the MFP 1 and the like, and also executes processing of accepting a registration request of each job such as copy, print, scan, and facsimile, or assigning a unique job ID to each job, and thus has a function of appropriately allocating the job. The main control module m1 can accept a job delete instruction from the user, and executes deletion of the job data and the like in such case. Furthermore, the main control module m1 also performs a control of access on the storage device (RAM 37 and HDD 47). When the HDD 47 is handled as a storage region for the file system due to the function of the operating system (OS, e.g., VxWorks, XFS), the main control module m1 also executes an access control on the file system. For instance, when the user inputs the authentication print job to the MFP 1, the data is input to the main control module m1 via a network processing module m1 and a PC Print application module m6, wherein the main control module m1 saves the relevant data in a predetermined storage region in the HDD 47. When the user instructs deletion or movement of the data in the HDD 47, the main control module m1 similarly executes deletion and movement of the data in the HDD 47.

The printer control module m2 is a module having a function of controlling the printer unit 51. The printer control module m2 causes the printer unit 51 to execute the printout process based on the set printing condition (printing mode: one-side/double side, stamp printing and the like). The printer control module m2 controls the printer unit 51 even in the printout process and the like at the time of facsimile reception.

The scanner control module m3 is a module having a function of controlling the scanner unit 53. The scanner control module m3 causes the scanner unit 53 to execute a scan operation process according to a predetermined scan mode (using an ADF, using a document reading glass surface, and the like) based on the set scan condition (character/photograph mode etc.). The scanner control module m3 controls the scanner unit 53 even in the document reading process and the like at the time of facsimile reception.

The facsimile processing module m4 is a module having a function of controlling the facsimile unit 55. The facsimile processing module m4 receives a notification of arrival from the facsimile unit 55 at the time of facsimile/data reception to send a request of registration of a facsimile/data reception job to the main control module m1 or instruct the start of execution of the relevant reception job. In transmission and reception of the facsimile data, a public line usage mode using a modem (not shown) of the facsimile unit 55 and an Internet/fax mode using the communication interface 61 coexist.

The network processing module m5 is a module having a function of executing the network process through the communication interface 61. In the MFP 1, the network processing module m5 supporting a communication protocol of TCP/IP and the like is connected to the communication interface 61, and used as a front end. A request received through the communication interface 61 from outside is retrieved to the inside through a message queue provided by the OS (VxWorks). The network processing module m5 sends the result of the process executed based on the content of the retrieved request to the communication interface 61. The network processing module m5 supports the TCP/IP, IPX/SPX, SNMP, and the like, and can receive the print data via the Internet from the PC5 (FIG. 6) connected to the external network 3 (FIG. 6), and can send the received print data to the PC Print application module m6. The MFP 1 then realizes the printout process based on the data received via the Internet. Similarly for the print data which setting of the authentication print (touch & print) is turned ON, the network processing module m5 sends the received print data to the PC Print application module m6. Subsequently, the main control module m1 saves the print data or the job data created based on the print data in a predetermined region (touch & print box 23 (FIG. 4)) of the HDD 47. Furthermore, the network processing module m5 receives the authentication data and the like (authentication data and the like) in the IC card 65 (FIG. 8) received by the authentication unit 9 (FIG. 8), and sends the received authentication data and the like to the authentication data management module m8. Thus, the network processing module m5 has a function of executing the interface process between the communication interface 61 and the authentication unit 9, and the module group (m1, m4, m6, m7, m8).

The PC Scan application module m6 is a module having a function of executing the scan process based on the instruction from the PC 5 (FIG. 6) connected to the MFP 1 by way of the network 3. When receiving the instruction to execute the scan from the PC 5, the PC Scan application module m6 executes the scan job according to the relevant instruction, creates an image data file, and transmits the image data file to the PC 5 (FIG. 6) via the network processing module m5, the communication interface 61, and the network 3 (FIG. 6). When the user inputs the instruction to execute the scan to the MFP 1 through the user interface 57, the instruction to execute the scan job is sent by the user interface control module m9 and the main control module m1.

The PC Print application module m7 is a module having a function of executing the printout process based on the instruction from the PC 5 (FIG. 6) connected to the MFP 1 by way of the network 3. For instance, when the user inputs the authentication print job from the PC 5 to the MFP 1, the PC Print application module m7 receives the print data via the network processing module m5, creates a bitmap image data from the relevant print data, and sends the job data including the relevant bitmap image data to the main control module m1. The main control module 1 then saves the job data related to the authentication print job to a predetermined box (touch & print box 23) in the HDD 47.

The authentication data management module m8 is a module having a function associated with the user authentication process. For instance, associated with the authentication print job, the authentication data management module m8, when receiving the authentication data and the like from the network processing module m5, checks the same with the user authentication information held in the HDD 47 and the like in advance, and determines success/fail of the user authentication. If the determination is success, the authentication data management module m8 notifies to the main control module m1 that the user authentication is successfully completed. The main control module m1 transmits the job data held in the HDD 47 in the temporarily stored state to the PC Print application module m7, and the PC Print application module m7 sends the instruction to execute the printout process to the printer unit 51. The printed material related to the authentication print job is then discharged from the printer unit 51.

The user interface control module m9 is a module having a function of controlling input/output of information via the user interface 57. The user interface control module m9 executes the processing of the signal sent from the input unit 59 of the user interface 57 as an event process, and executes a screen processing program of generating the content displayed on the display unit 21 (liquid crystal touch panel). The screen processing program includes programs related to pre-process of a case the screen to be displayed is determined, screen display process on the display unit 21, and the processing of the event driven by a hardware key, a software key, and the like while a specific screen is being displayed. The processing of the event includes notifying the information related to the specification to the main control module m1 to execute the operation of the MFP 1 specified by the user through the input unit 59, or notifying a response from the MFP 1 to the user by executing transition to the next appropriate screen display. The display of a list of jobs is executed, as necessary, in time of execution of the authentication print job.

The image forming program according to the present invention is realized by having the module groups (m1 to m9) described above and other various module groups (not shown) cooperatively operate. The image forming program according to the present invention, however, may be installed in the MFP 1 as a single module. That is, the image forming program according to the present invention is not limited at all in terms of form of presentation.

<Functional Configuration of Image Forming Device>

Figure 10:
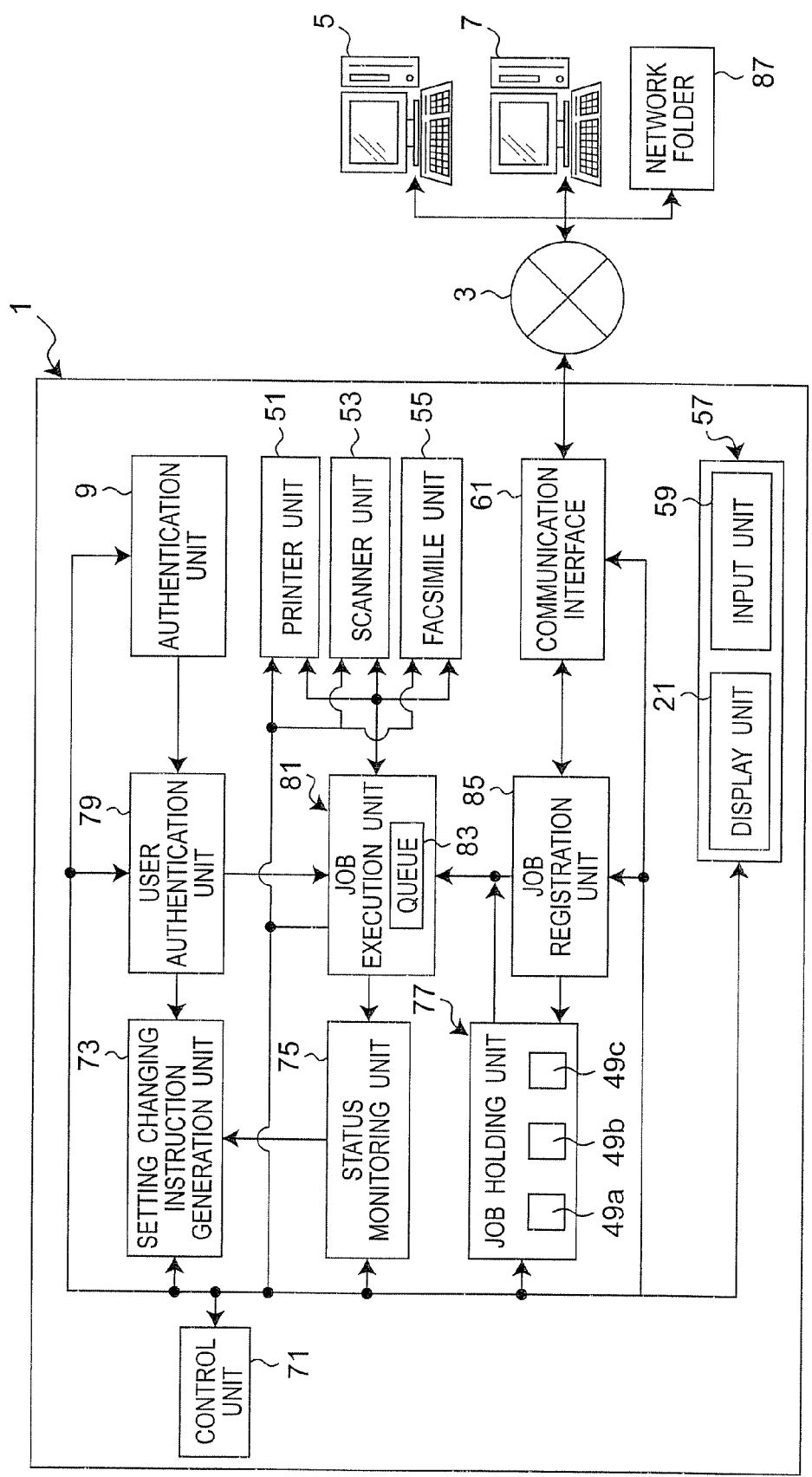
FIG. 10 is a block diagram of a functional configuration of the MFP 1.

FIG. 10 is a block diagram of the configuration of the MFP 1 by using functional blocks. The illustration for the functions of the MFP 1 not related to the present embodiment is omitted. Some of the blocks are realized by having the CPU 13 (FIG. 2) execute the image forming program and the like according to the present embodiment. That is, the functional blocks shown in FIG. 10 is realized by having the hardware components shown in FIG. 7 and the modules shown in FIG. 9 cooperatively operate.

The MFP 1 includes a control unit 41. The control unit 41 is connected to each block of the MFP 1 so as to be able to transmit and receive data, grasps the state of each block, and appropriately controls the operation of each block.

The communication interface 61 receives the print data from the PC 5 and the like via the network 3, as already described.

The relevant print data has a data structure having data related to the setting of the printout process (set parameter data), and data of the document to be printed out (document data). The former, set parameter data include a parameter (authentication print setting parameter) indicating whether or not to execute the printout process as the authentication print, data of the user name and the password inputted by the user, a parameter of a print mode (one-side/double side, and the like), data of the settings of the process (save, delete, and the like) of the job data of the job after the authentication print job is completed, and the like. The data of the password is provided to prove that the print data is created by the true user. In addition, the data for the authentication may be used for the user authentication for the authentication print. The print data received by the communication interface 61 is sent to a job registration unit 85.

The job registration unit 85 references the set parameter data of the received print data, and acquires information (user name) of the owner of the printout process (print job) related to the print data from a user identification code (user name). The job registration unit 85 develops the print data to bitmap image data, and generates job data from the bitmap image data and the set parameter data. The job registration unit 85 can reference the data (registered user information data) indicating the correspondence of the user name and the password held in the HDD 47 in advance when the print data also includes the password. However, if the relevant registered user information data is held in a device exterior to the MFP 1, and the MFP 1 can access the relevant registered user information data, the MFP 1 does not need to internally hold the registered user information data.

The job registration unit 85 references the authentication print set parameter of the set parameter data of the print data, and determines whether or not to printout process the job related to the relevant print data as the authentication print. When the job registration unit 85 determines to execute the job as the authentication print job, the job data of the job is sent to a job holding unit 77, and held in the job holding unit 77 as authentication print job data. Here, the MFP 1 recognizes the authentication print job data held in the job holding unit 77 until the user authentication for the authentication print is completed as the job data in the temporarily stored state (hold state).

When the job registration unit 85 determines to execute the job as the normal printout process, which is not the authentication print, the job data of the job is immediately sent to a job execution unit 81, and the job is immediately executed or placed in a queue 83.

The job holding unit 77 holds the authentication print job data until the user, being the owner of the job data, successfully completes the user authentication. In the job holding unit 77, the authentication print job data is held in a predetermined box (touch & print box 49a).

The job execution unit 81 executes the job based on the received job data. However, the MFP 1 places the job data in the queue 83 if the job related to the job data cannot be immediately executed at the point of receiving the job data. The MFP 1 recognizes the job data in execution as the job data in the execution state, and recognizes the job data in the queue 83 as the job data in the execution queuing state.

The user authentication unit 79 monitors the input of the input authentication data from the authentication unit 9. When the user authentication unit 79 receives the input of the input authentication data from the authentication unit 9, the user authentication unit 79 checks the input authentication data that is input and the data for user authentication of the authentication print held in advance, determines success/fail of the user authentication, and outputs the relevant determination result. Here, the data structure of the input authentication data may be appropriately selected according to the authentication method used in the user authentication. The input authentication data merely needs to include the user identification code (user name) and the user authentication data. The user authentication data is the password character string inputted by the user, the user authentication data held in the IC card, the biological features unique to the user individual, and the like. Depending on the authentication method used in the user authentication (e.g., in biometrics authentication), the input authentication data only needs the user authentication data and does not require the user name. In the present specification, a device for acquiring the biological features and the like to perform biometrics authentication is referred to as a biometric authentication device. The MFP 1 holds the user authentication data (password etc.) corresponding with the user identification code (user name) as the data for the user authentication of the authentication print.

A status monitoring unit 75 monitors the status of the job execution unit 81 (and queue 83) of the MFP 101. As the status monitoring unit 75 monitors the job execution unit 81 and the queue 83, the control unit 41 of the MFP 101 can recognize what kind of job exists in the execution state and/or execution queuing state in the MFP 101.

The status monitoring unit 75 monitors the status of the job execution unit 81 (and queue 83) of the MFP 101, and outputs the information related to the job in execution and the job in execution queuing to a setting changing instruction generation unit 73 (abbreviated as "instruction generation unit 73," hereinafter.). The information related to the job in execution and the job in execution queuing merely needs to include the data (job ID) uniquely specifying the job and the data of the state of the relevant job.

The instruction generation unit 73 can receive the information indicating that the user authentication is successfully completed and the user name of the user related to the user authentication from the user authentication unit 79. In addition, the instruction generation unit 73 can receive the information related to the job currently in execution in the job execution unit 81 and the information related to the job currently in execution queuing (standby) in the queue 83 from the status monitoring unit 75. When receiving the information indicating that the user authentication is successful from the user authentication unit 79, the instruction generation unit 73 outputs an instruction to change the settings set with respect to the authentication print job, the owner of which is the user related to the relevant user authentication, from the current settings to another settings based on the information input from the status monitoring unit 75. Another settings is defined by the MFP 1 in compliance with a predetermined rule.

When receiving the setting changing instruction from the instruction generation unit 73, the control unit 71 changes the settings set with respect to the authentication print job, and outputs an instruction reflecting the change of the settings immediately to the job execution unit 81. The job execution unit 81 immediately executes the process of changing the settings of the authentication print job in execution or in execution queuing based on the relevant instruction.

<Image Forming Process Flow>

The flow of image forming process in the MFP 1 according to the first embodiment of the present invention will now be described with reference to FIGS. 11A, 11B, 12, 13, and 14.

Figure 11A:
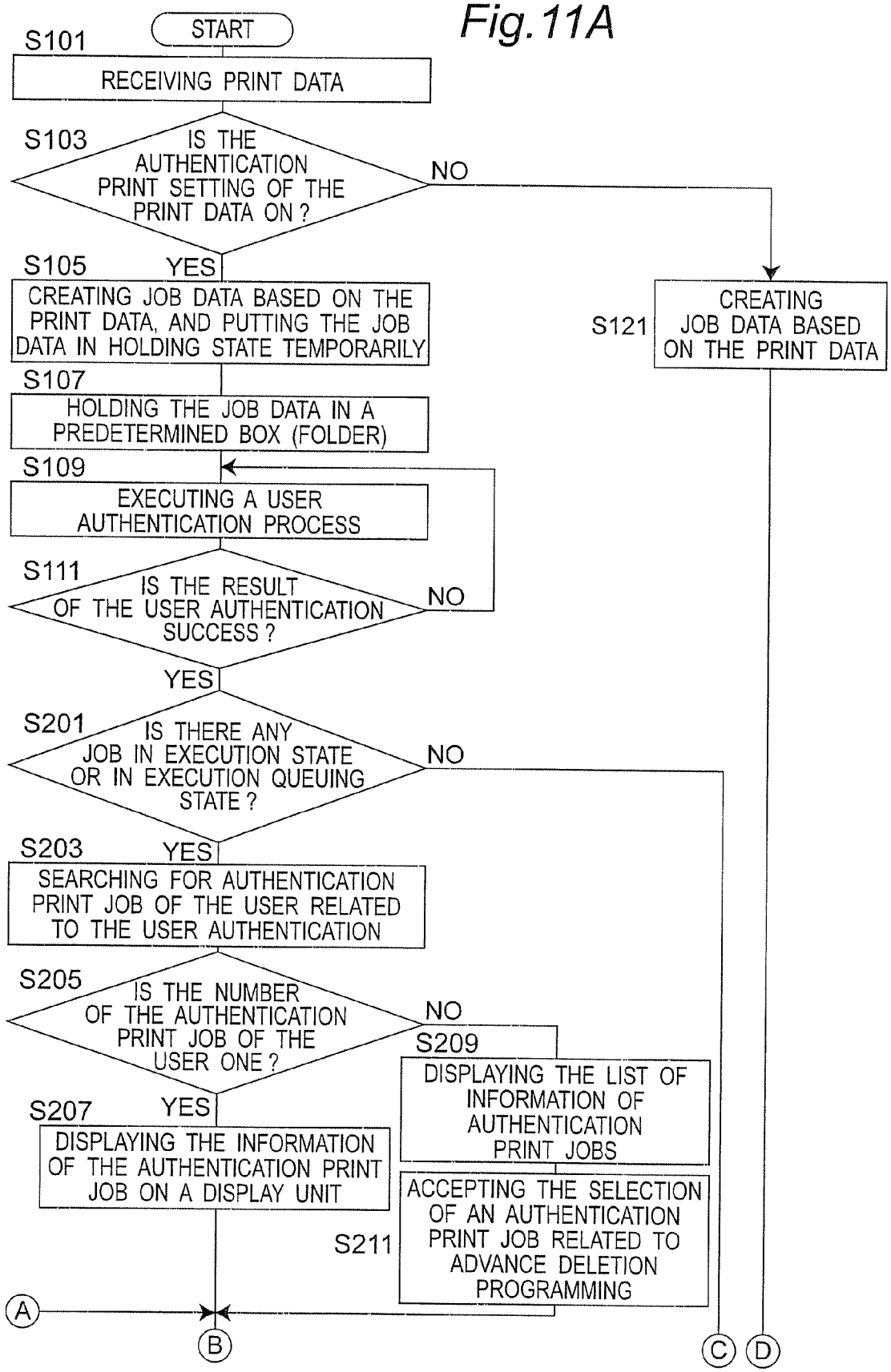
FIG. 11A is a flowchart of the process executed by the MFP 1.

First, FIGS. 11A and 11B will be referenced. FIGS. 11A and 11B are flowcharts describing the flow of the image forming process executed in the MFP 1. The already described steps shown in FIG. 2 are denoted with reference numerals similar to the reference numerals in FIG. 2. The description on such steps will be appropriately omitted.

The process from step S101 to step S111 are as already described with reference to FIG. 2. The authentication print job data held in the touch & print box 47a in step S107 is sent to the job execution unit 81 in response to a successful determination ("YES" in step S111) of the user authentication in step S111. The authentication print job data sent to the job execution unit 81 changes from the temporarily stored state to the execution state or the execution queuing state.

The MFP 1 may execute a login process on the user who has performed the user authentication in step S111. However, if another user has already completed the user authentication for authentication print and is still logged into the MFP 1, the MFP 1 does not execute the login process on the relevant user to avoid a double login state. This process is executed by the authentication data management module m8 (FIG. 9) and the like. In such case, the MFP 1 executes the process of the image forming flow shown below with the relevant user in a non-logged state.

The authentication print jobs are respectively set with a predetermined settings in advance with respect to the method of handling the job data after the job completion. The predetermined settings may be the settings of, for example, 1. Save the job data in the touch & print box 49a after the job completion,
2. Delete the job data after the job completion,
3. Move the job data to a predetermined box after the job completion.

The settings of compressing the job data may also be additionally set with respect to the settings 1 and 3.

The purpose and the effect of moving the job data to the predetermined box after the job completion will be briefly described below with respect to the setting 3. The touch & print box 49a is a box accessible by any user registered in the MFP 1. Thus, quite a lot of users may feel discomfort from the standpoint of data security in saving the job data in the touch & print box 49a. If the user loses the user authentication IC card 65 (FIG. 8), a third person who finds the card 65 may execute the authentication print job. To this end, the user sometimes desires a data management form of once moving the job data to a different box, and thereafter sorting between the job data to save and the job data to delete. In this case, the user merely needs to set the setting 3 to the job data. Here, the user can cast aside the discomfort in data security by selecting a personal box 49b (FIG. 10) accessible only by the a specific user, a confidential document dedicated box 49c (FIG. 10) requiring another further password for access, and the like as another box being the moving destination of the job data.

Figure 12:
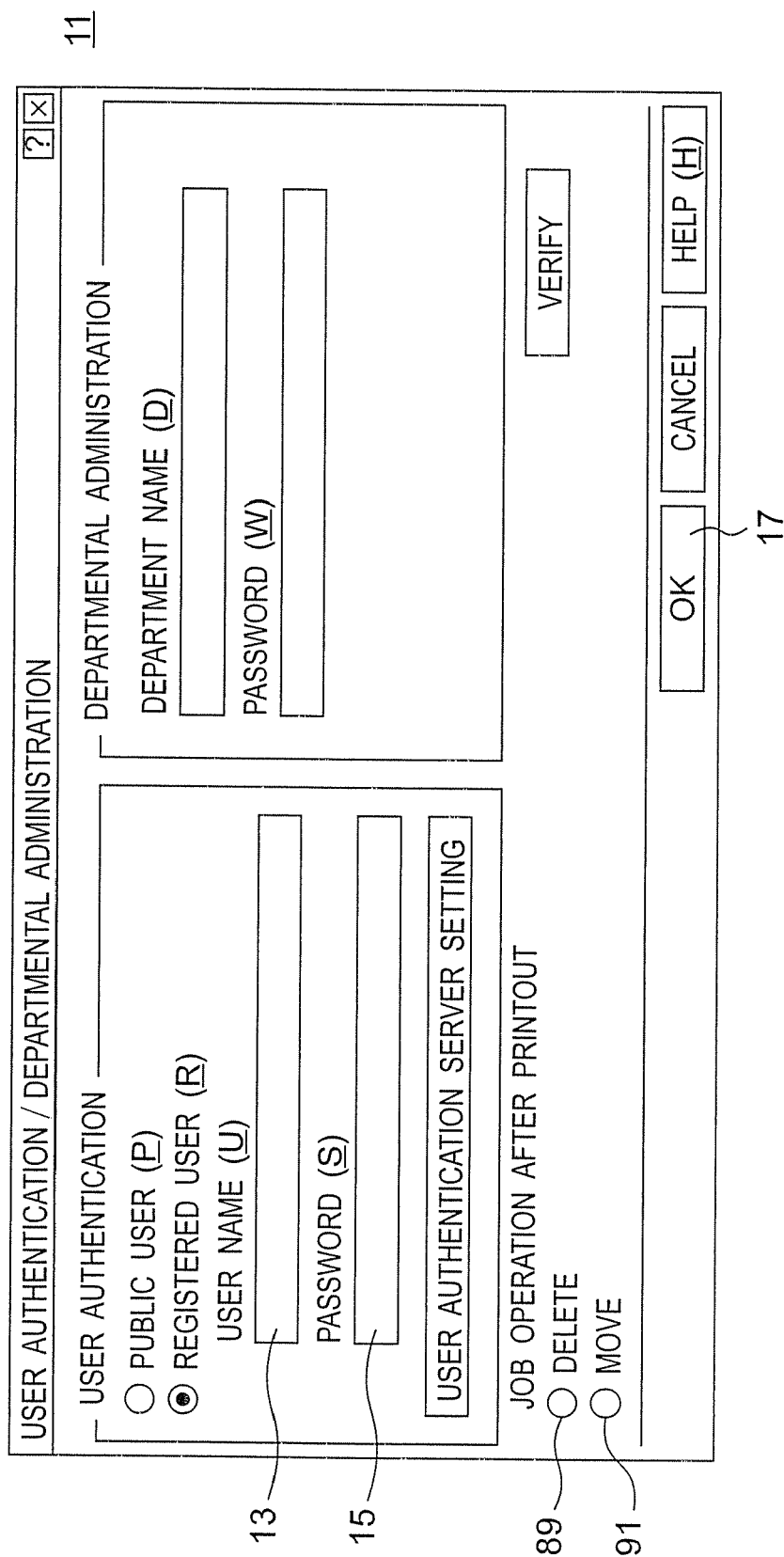
FIG. 12 is an exemplary diagram of a user interface of a printer driver.

This setting can be set by the user for every authentication print job in the PC5 in time of print data creation. FIG. 12 is an exemplary diagram of the user interface 11 of the printer driver software provided to create the print data in the PC 5. The user can set the handling method of the job data after the job completion of the authentication print job by selecting a radio button 89 or 91. When the user selects a move radio button 91, the user can set the moving destination to which the job data is moved after the job completion. An external network folder 87 (FIG. 10) of the MFP 1 can be selected for the moving destination. As an initial setting in the MFP 1, the job data handling method after job completion that is effective on the job data of all the authentication print jobs may be set. In the present embodiment, description will be made that "1. Save the job data in the touch & print box 49a after the job completion" is set as the initial setting of the MFP 1 for all the authentication print jobs.

In step S201, the MFP 1 determines whether or not a job ("another job" in FIG. 11A) other than the authentication print job related to the user who performed the user authentication, which is the target of determination process in step S111, is in the execution state in the job execution unit 81, or whether or not in the execution queuing state in the queue 83 of the job execution unit 81. If the MFP 1 determines that another job is in the execution state or in the execution queuing state in the job execution unit 81 ("YES" in step S201), the process proceeds to step S203. If the MFP 1 determines that another job is neither in the execution state nor the execution queuing state in the job execution unit 81 "NO" in step S201, the process proceeds to step S219 (FIG. 11B).

In step S203, the MFP 1 searches for the authentication print job of the user, and obtains number of authentication print jobs which owner is the user.

In step S205, the MFP 1 determines whether or not the number of authentication print jobs of the user is one based on the result of the search in step S203. If the MFP 1 determines that the number of authentication print jobs of the user is one ("YES" in step S205), the process proceeds to step S207. If the MFP 1 determines that the number of authentication print jobs of the user is not one (two or more) ("NO" in step S205), the process proceeds to step S209.

In step S207, the MFP 1 displays information of the authentication print job of the user (e.g., name of job, print data received date and time, and the like) on the display unit 21 of the user interface 57. After the process of step S207 is completed, the process proceeds to step S213.

In step S209, the MFP 1 displays in a list the information of the authentication print job of the user (e.g., name of job, print data received date and time, and the like) on the display unit 21 of the user interface 57.

FIG. 13 is a diagram of a display example of the display unit 21 in step S209. The job list is displayed including jobs of other users which execution order is before the authentication print job of the user. In the present example, the user who performed the user authentication is User-A. The authentication print job of the user who performed the user authentication is desirably displayed in a manner visually distinguishable from other jobs. Here, the authentication print job of the User-A is JobA1(J2) and JobA2(J5). It can be recognized that currently, JobB1(J1) of User-B as well as JobC1(J3) and JobC2(J4) of User-C are registered as jobs which execution order is before the JobA1(J2) or JobA2(J5) in the MFP 1.

The user selects the authentication print job which job data is to be deleted after the job completion, and inputs the relevant selection to the MFP 1 by using the input unit 59 of the user interface 57.

In step S211, the MFP 1 accepts the input of selection on the authentication print job which job data is to be deleted after the job completion of the authentication print jobs of the relevant user displayed through the process of step S209.

In step S213, the MFP 1 determines whether or not the user again performed the user authentication. If the MFP 1 determines that the user authentication again by the relevant user is accepted ("YES" in step S213), the process proceeds to step S215. If the MFP 1 determines that the user authentication again by the relevant user is not accepted ("NO" in step S213), the process skips step S215 and proceeds to step S217.

In step S215, the MFP 1 executes a process of changing the settings with respect to the handling method of the job data after the job completion of the authentication print job.

The process in step S215 will be described with reference to FIG. 14. FIG. 14 is an exemplary diagram of a job management table 93 held inside the MFP 1. The job management table 93 is generated based on transmission and reception of information of the status of the job cooperative of the control unit 71, the status monitoring unit 75, the user authentication unit 79, the job execution unit 81 and its queue 83, as well as the job registration unit 85 (all shown in FIG. 10). From another standpoint, the job management table 93 can be said as being generated based on transmission and reception of information of the status of the job cooperative of the main control module m1, the printer control module m2, the network processing module m5, the PC Print application module m7, the authentication data management module m8, and the user interface control module m9 (all shown in FIG. 9).

The job management table 93 includes an operation flag column CS. The operation flag column CS is recorded with an operation flag for each job (J1 to J5). In the present example, the operation flag is one of 0, 1, or 2. The operation flag may, of course, include more types (number of bits).

The operation flag "0" means that the job data handling method of executing the operation of saving the job data in the storage region as it is after the job is completed is set for the relevant job. In the present example, the zero setting of the operation flag is the set value at the time of print data reception.

The operation flag "1" means that the job data handling method of executing the operation of deleting the job data after the job is completed is set for the relevant job.

The operation flag "2" means that the job data handling method of executing the operation of moving the job data to a storage region different from the current storage region after the job is completed is set for the relevant job.

Looking at the operation flag for the JobA1(J2), the value thereof is "1". With respect to the JobA1(J2), it can be found that the handling method of the job data after the job completion has been changed from the setting at the time of reception of the print data based on the user authentication performed again after the user authentication for instructing the start of execution of the authentication print job in step S213.

Therefore, in the MFP 1 according to the first embodiment of the present invention, when the user authentication unit 79 (FIG. 10) outputs a signal indicating success of the user authentication by the user of the authentication print job to the setting changing instruction generating unit 73 under the situation where the status monitoring unit 75 (FIG. 10) outputs a signal indicating the existence of the authentication print job changed to the execution state or the execution queuing state to the setting changing instruction generating unit 73 (FIG. 10), the setting changing instruction generating unit 73 outputs an instruction to change at least one part of the settings set for the authentication print job to the control unit 71 (FIG. 10). When receiving the instruction to change the settings from the setting changing instruction generating unit 73, the control unit 71 changes the settings set on the relevant authentication print job according to the relevant instruction. The job execution unit 81 (FIG. 10) immediately reflects such change, and continues the execution of the job.

In step S217, the MFP 1 determines whether or not the job other than the authentication print job of the user is still in execution. If the MFP 1 determines that the job other than the authentication print job of the user is still in execution ("YES" in step S217), the process returns to step S213. If the MFP 1 determines that the job other than the authentication print job of the user is not in execution ("NO" in step S217), the process proceeds to step S219.

The process may be configured such that the display of information of the authentication print job in step S207 and step S209 is displayed only for a preset time (e.g., thirty seconds). When the process is configured in such manner, the processes of step S211, step S213, and step S215 are configured such that the MFP 1 accepts the input of the selection of the job by the user and the user authentication while the display associated with step S207 or step S209 is continuing.

In step S219, the MFP 1 executes the authentication print job at the earliest execution order of the authentication print jobs of the user in the execution queuing state (in queue). The remaining authentication print jobs are placed in the queue (execution order is changed).

After step S219, one of the authentication print jobs of the user is in the execution state in the MFP 1.

In step S221, the MFP 1 determines whether or not the user has further carried out the procedure of the user authentication. If the MFP 1 determines that the user authentication again by the user is accepted ("YES" in step S221), the process proceeds to step S223. If the MFP 1 determines that the user authentication again by the user is not accepted ("NO" in step S221), the process skips step S223 and proceeds to step S225.

In step S223, the MFP 1 executes the process of changing the settings with respect to the handling method of the job data after the job completion of the authentication print job currently in the execution state. In relation to step S223, the MFP 1 may display a message such as "Delete job in printing" on the display unit 59, and notify the user that the settings has been changed. Furthermore, as hereinafter described, if the settings of the authentication print job is changed from saving the job data to the touch & print box 49a after the job completion to moving the job data to another predetermined box after the job completion with the user authentication as a trigger, the MFP 1 may display a message such as "Move job in printing to XXX".

The difference in the processing content between step S223 and step S215 is that the authentication print job currently in the execution state is the target job to change the settings in step S223. The processing contents in step S223 and step S215 are substantially the same for other points.

In step S225, the MFP 1 completes the execution of the authentication print job.

In step S227, the MFP 1 executes the process of saving in the touch & print box 49a, deleting, and moving to another box according to the settings set with respect to each job data of each authentication print job which execution is completed.

In the example of the process described with reference to FIGS. 11A and 11B, the settings of the authentication print job is changed to the settings of deleting the job data after completion of the job by the completion of further user authentication in a state the authentication print job is in the execution state or in the execution queuing state, but the content of the change of the settings is not limited to "deleting".

When again accepting the user authentication after the user authentication to start the execution of the authentication print job is successfully completed, the MFP 1 according to the first embodiment of the present invention can execute the process of changing the setting of the authentication print job from the settings originally set to the relevant authentication print job (save to touch & print box 49a) to another settings (move job data to another box).

If another box to which the job data is to be moved is the storage region outside the MFP 1 such as the network folder 87 (FIG. 10), the MFP 1 can automatically encrypt the job data by using the authentication data used for the user authentication and move the job data to the relevant other box.

The MFP 1 can be configured to select and determine the changing content of changing the setting related to the setting of the authentication print job according to the number of acceptances of the user authentication after the second time accepted after the user authentication to start the execution of the authentication print job is successfully completed. For instance, the setting is changed to "delete" the job data if the MFP 1 accepts one more user authentication, the setting is changed to "move" the job data to a predetermined box if the MFP 1 accepts two more user authentications, and cancels the changing of the setting (save to touch & print box 49a) when the MFP 1 accepts three more user authentications.

The number of times the user authentication is accepted is determined based on the operation clock of the IC card reader 9 when the means of the user authentication is the IC card 65 (FIG. 8) and the IC card reader 9 (FIG. 8). For instance, the MFP 1 recognizes that the user authentication of a total of two times is accepted if after the IC card reader 9 reads the authentication data recorded on the IC card 65, the IC card reader 9 does not read the authentication data over a time greater than or equal to a predetermined number of operation clocks, and thereafter, the IC card reader 9 again reads the authentication data recorded on the IC card 65.

When the reading of the authentication data of plural times is performed within a time interval being smaller than the predetermined number of operation clocks, the MFP 1 recognizes that the IC card 65 has been continuously placed over the IC card reader 9 over the time interval of the reading of the authentication data of plural times, and recognizes the number of acceptances of the user authentication as one.

When the reading of the authentication data of plural times is performed within a time interval being smaller than the predetermined number of operation clocks, the MFP 1 may record the time interval (number of operation clocks) of the time (operation clock) the first reading is performed and the time (operation clock) the last reading is performed of the reading of the authentication data of plural times, and select and determine the changing content of the settings set to the job data of the authentication print job based on such time interval.

Figure 15:
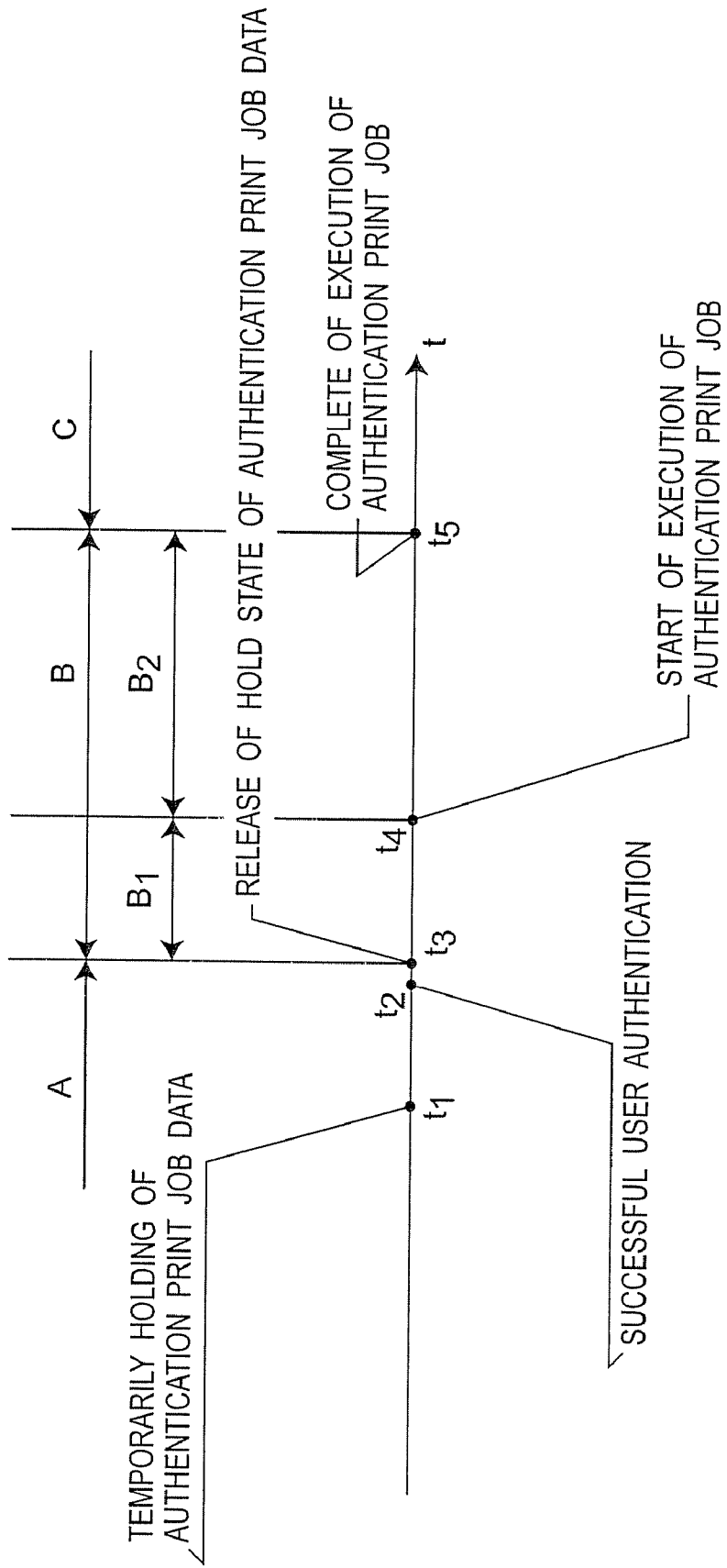
FIG. 15 is a time-series schematic diagram of the process in the image forming device.

FIG. 15 is a diagram briefly describing from the reception of the print data of the authentication print job of the MFP 1 according to the first embodiment of the present invention to the completion of the authentication print job along the time axis. The characteristic technical idea of the present invention will be summarized with reference to the figure.

At time t1, the MFP 1 receives the print data which authentication print setting is set to the ON setting. The MFP 1 creates the authentication print job data from the relevant print data, sets the job data in the temporarily stored state, and holds the same in the touch & print box 49a (FIG. 10) of the job holding unit 77.

At time t2, the MFP 1 accepts the user authentication for starting the execution of the authentication print job. The MFP 1 releases the temporarily stored state of the job data related o the authentication print job at time t3 assumed as practically the same as time t2, and sends the job data to the job execution unit 81 (FIG. 10).

At time t4, the MFP 1 starts the execution of the authentication print job related to the job data. If other jobs are not in the queue 83 (FIG. 10), time t3 and time t4 substantially coincide.

At time t5, the MFP 1 completes the execution of the authentication print job related to the job data.

When the user again performs the user authentication during a period (period from t3 to t5) shown as B in the figure, the MFP 1 according to the first embodiment responds to the acceptance of the user authentication, and executes the process of changing the settings set to the relevant authentication print job to a different settings. That is, the MFP 1 according to the first embodiment can change the setting of the authentication print job based on the user authentication performed by the user of the relevant authentication print job in a state where the authentication print job is in the execution queuing state (period B1) or in the execution state (period B2). Thus, the user does not require complex operation for login, and input for changing the setting through the input unit 59 of the user interface 57 when desiring to change the setting of the authentication print job. The instruction to change the setting by the user by using the user authentication procedure is also possible even when the job of another user is in execution. Thus, the MFP 1 according to the present invention has an effect in that the operability thereof is significantly improved.

Second Embodiment

Similar to the image forming device according to the first embodiment of the present invention, in the image forming device (MFP) according to a second embodiment of the present invention, when accepting the user authentication (second and subsequent user authentications) by the user related to the authentication print job in execution within a predetermined period, a process of changing the settings from the settings at the reception of the print data to another settings can be executed with respect to the settings set with respect to the authentication print job in execution based on the second and subsequent user authentications. The settings is the settings with respect to the number of sets of prints of the document related to the relevant authentication print job. For instance, in the image forming device (MFP) according to the second embodiment of the present invention, the settings can be changed so as to increase the number of sets of the document to be printed out based on the second and subsequent user authentications.

According to such configuration, in the image forming device according to the second embodiment of the present invention, the user can change the number of sets of prints of the document related to the authentication print job with only the user authentication operation of touching the IC card and the like to a predetermined authentication device without being requested complex operation such as login operation and operation of selection of the job through the input unit with respect to the authentication print job in execution or in execution standby (queuing). Obviously, the set value before changing the setting related to the number of sets of prints of the document is the set value set when the print data is created in the PC 5 (FIG. 10) and the like.

Thus, in the image forming device according to the present embodiment, the present image device is advantageous in terms of operability since the user can easily and rapidly change the setting related to the authentication print job in the execution state.

<Image Forming System>

The configuration of the image forming system using the image forming device according to the second embodiment of the present invention may be similar to the image forming system 100 shown in FIG. 6 referenced in the description of the first embodiment. Thus, the description thereof will be omitted.

<Hardware Configuration of Image Forming Device>

The configuration of the image forming device according to the second embodiment of the present invention may be similar to the MFP 1 shown in FIG. 7 referenced in the description of the first embodiment. Thus, the description thereof will be omitted.

<Software Configuration of Image Forming Device>

The software configuration of the image forming device according to the second embodiment of the present invention may be similar to the software configuration shown in FIG. 9 referenced in the description of the first embodiment. Thus, the description thereof will be omitted.

<Functional Configuration of Image Forming Device>

The functional configuration of the image forming device according to the second embodiment of the present invention may be similar to the functional configuration shown in FIG. 10 referenced in the description of the first embodiment. Thus, the description thereof will be omitted.

<Image Forming Process Flow>

The flow of the image forming process in the MFP 1 according to the second embodiment of the present invention will be described below with reference to FIG. 16.

Figure 16:
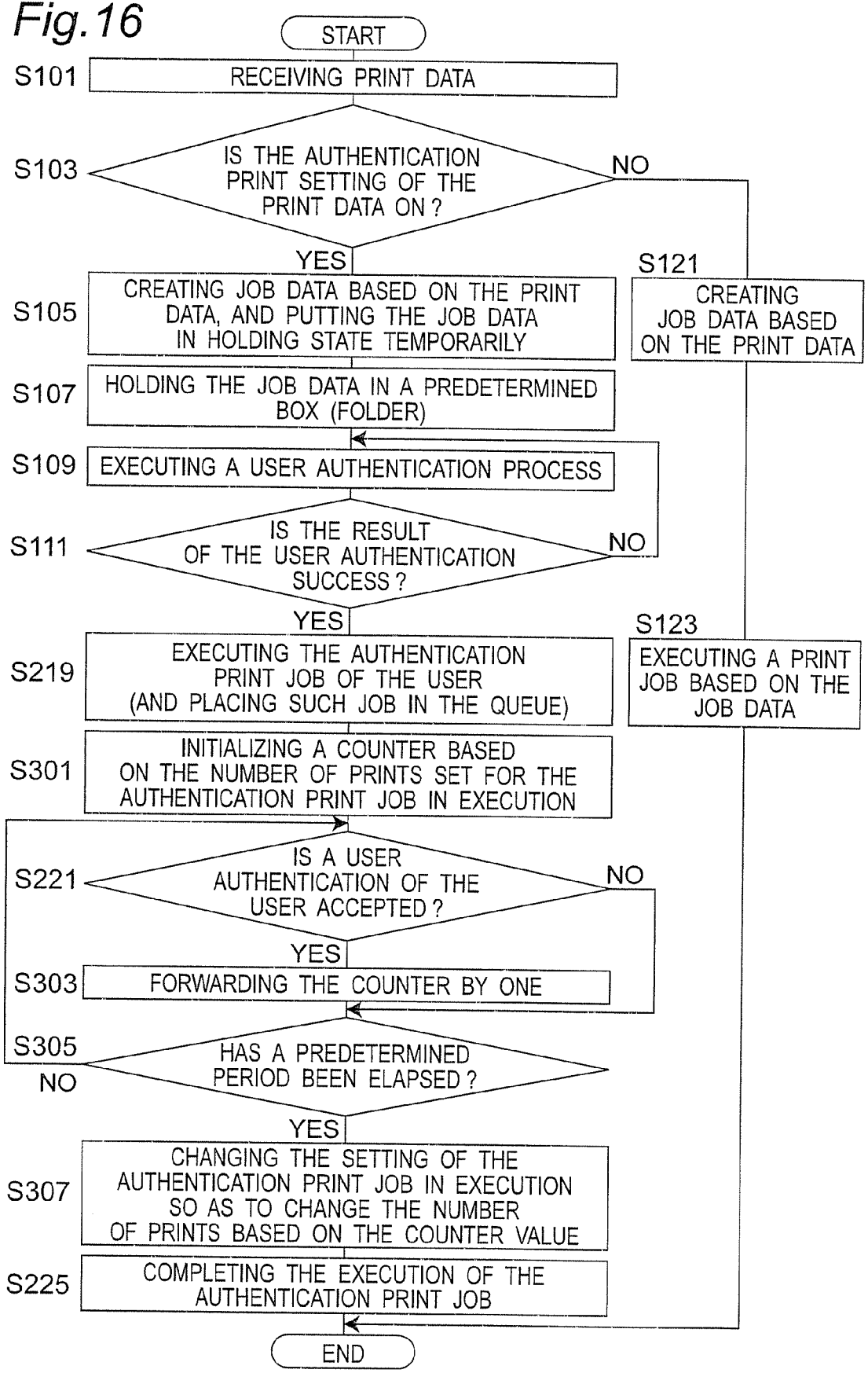
FIG. 16 is a flowchart of the process executed by the MFP 1.

FIG. 16 is a flowchart describing the flow of the forming process executed in the MFP 1. The already described steps shown in FIGS. 2, 11A, and 11B are denoted with reference numerals similar to the reference numerals in FIGS. 2, 11A, and 11B. The description of such steps will be appropriately omitted.

The processes from step S101 to step S103, step S105, step S107, step S109, step S111, and step S219 are as described above with reference to FIGS. 2, 11A, and 11B. In the second embodiment, the authentication print job in the execution state is the target of processing, and thus the existence of other jobs of other users is not taken into consideration in the flowchart of FIG. 16. However, even if other jobs of other users exist, those skilled in the art should be able to easily implement the MFP 1 according to the second embodiment by reading the following description.

In step S301, the MFP 1 sets the value of the counter (assumed as C) with reference to the number of sets of prints of the document (assume as N, N is a natural number) currently set to the job data of the authentication print in execution. Here, the value of the counter C is set to the same value (C←N) as the current document print set number N.

In step S221, the MFP 1 determines whether or not the user has further carried out the procedure of the user authentication. If the MFP 1 determines that the user authentication again by the user is accepted ("YES" in step S221), the process proceeds to step S303. If the MFP 1 determines that the user authentication again by the user is not accepted ("NO" in step S221), the process skips step S303 and proceeds to step S305.

In step S303, the MFP 1 executes a process of increasing the value of the counter C by a predetermined value (e.g., 1) (C→C+1).

In step S305, the MFP 1 determines whether or not a predetermined time interval has elapsed after the process of step S301 is executed. If the MFP 1 determines that the predetermined time interval has elapsed after the execution of step S301 ("YES" in step S305), the process proceeds to step S307. If the MFP 1 determines that the predetermined time interval has not elapsed after the execution of step S301 ("NO" in step S305), the process returns to step S221, and accepts the procedure of further user authentication by the user.

In step S307, the MFP 1 references the value of the counter C, and changes the setting of the number of sets of prints of the document related to the authentication print job in the execution state based on the value of C.

In place of step S305 and step S307, the procedure of the user authentication by the user is accepted as needed during the execution of the authentication print job, and the setting of the number of sets of prints of the document related to the authentication print job in the execution state may be changed based on the value of the counter C every time such procedure is recognized.

The MFP 1 continuously executes the authentication print job based on the set value of the changed number of sets of prints of the document.

In step S225, the MFP 1 completes the execution of the authentication print job.

Thus, the MFP 1 according to the second embodiment of the present invention can execute the process of changing the setting of the number of sets of prints of the document related to the authentication print job in the execution state (authentication print job in period B2 in FIG. 15) from the settings (N sets) originally set to the relevant authentication print job to the settings (C sets) equal to the value of the counter C based on the number of accepted user authentications when the user authentication is again accepted after the user authentication to start the execution of the authentication print job is successfully completed.

The functions of the second embodiment may be added to the MFP 1 of the first embodiment. For instance, the change in setting is canceled (save in touch & print box 49a) when three more user authentications are accepted as previously described, and the value of the counter C is increased based on the number of user authentications after the fourth time.

Variant of Second Embodiment

In the MFP 1 according to the second embodiment, the number of sets of prints of the document can be increased according to the number of user authentications. However, when desiring to greatly increase the number of sets of prints of the document of the authentication print job currently in the execution state to, for example, thirty sets, the user needs to repeat the user authentication thirty times, which is irrational. In the variant of the second embodiment, an input assistance through the input unit 59 (e.g., ten key (number input key)) is introduced, and the instruction to increase to great amount of print sets is realized.

<Image Forming Process Flow>

The flow of the image forming process in the MFP 1 according to the variant of the second embodiment of the present invention will now be described with reference to FIG. 17.

Figure 17:
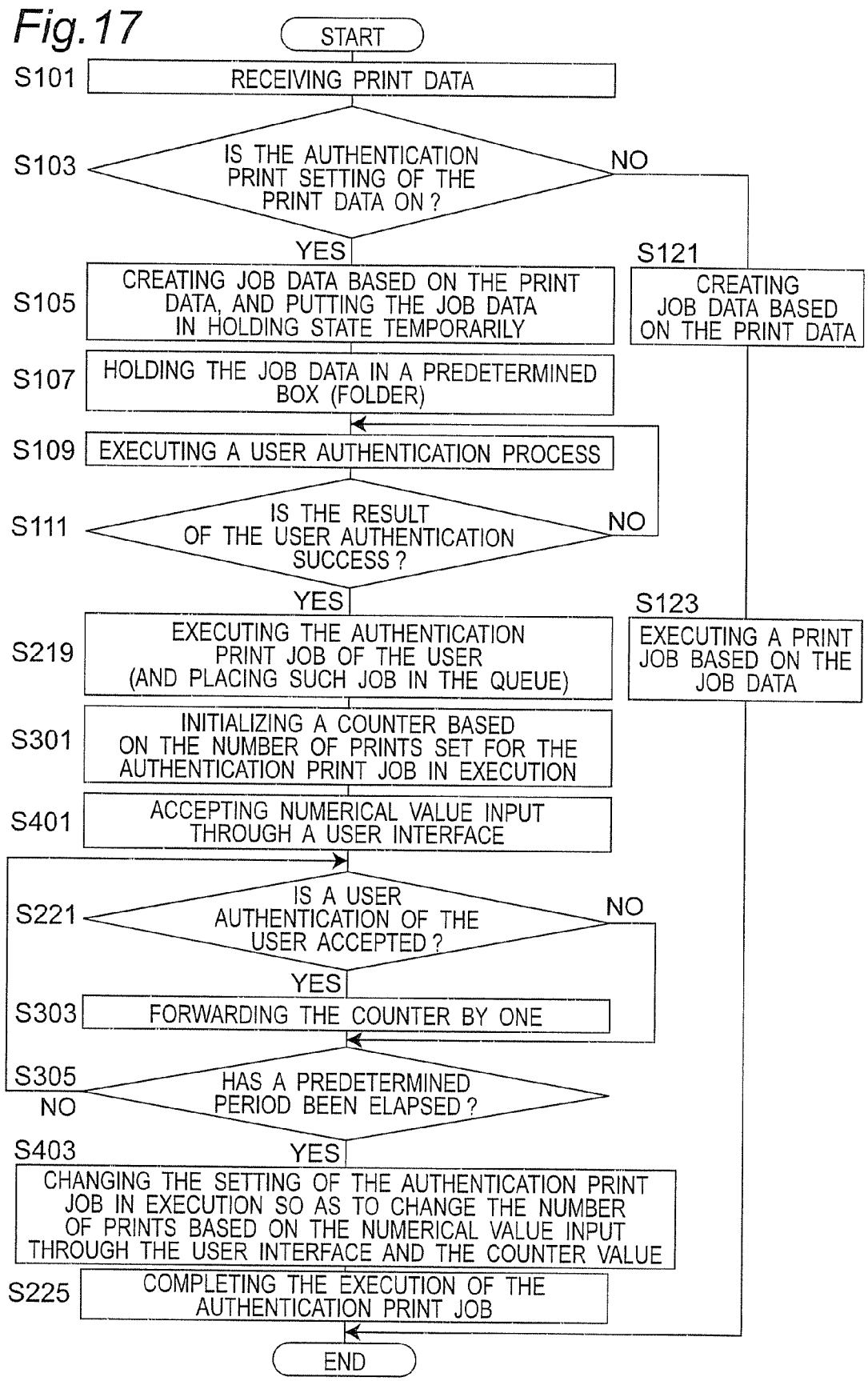
FIG. 17 is a flowchart of the process executed by the MFP 1.

FIG. 17 is a flowchart describing the flow of the image forming process executed in the MFP 1. The already described steps shown in FIGS. 2, 11A, 11B, and 16 are denoted with reference numerals similar to the reference numerals in FIGS. 2, 11A, 11B, and 16. The description of such steps will be appropriately omitted.

The processes from step S101 to step S401 are similar to those already described with reference to FIG. 16.

In step S401, the MFP 1 accepts input of the numerical value from the user using the ten key of the input unit 59. Suppose the value input from the ten key as T (e.g., T=3).

In step S221, the MFP 1 determines the presence of further user authentication procedure.

In step S303, the MFP 1 increases the value of the counter C by a predetermined value (e.g., 1).

In step S403, the MFP 1 changes the setting of the number of sets of prints of the document related to the authentication print job in the execution state based on both values of the input value T from the ten key and the value of the counter C. For instance, if the document print set number N set in advance is one, the ten key input value T is three, and the value of the counter C is two, the number of sets of prints of the document is increased by thirty-one sets from one set to $C+(T\times 10)=2+(3\times 10)=32$ sets. That is, in the present variant, the MFP 1 can increase the number of sets by the value obtained by multiplying a predetermined value (e.g., ten) to the value T input from the ten key.

Therefore, it is advantageous in greatly increasing the setting of the number of sets of prints of the document in the present variant.

In the second embodiment, an example of changing the setting of increasing the number of sets of prints of the document has been described, but the number of sets of prints of the document may be decreased. The MFP 1 according to the second embodiment is useful in that the settings with respect to the number of sets of prints can be changed by accepting the second and subsequent user authentications.

Third Embodiment

Similar to the image forming device according to the first and second embodiments of the present invention, in an image forming device (MFP) according to a third embodiment of the present invention, when the user authentication (second and subsequent user authentications) by the user related to the authentication print job in execution queuing (standby) is received within a predetermined period, a process of changing the authentication print job to actually execute from the settings set in the MFP 1 at the time of reception of the print data to another settings can be executed with respect to the authentication print job in execution queuing based on the second and subsequent user authentications. For instance, when the plurality of authentication print jobs related to the user are in the temporarily stored state in the MFP at the point the user performed the user authentication to start the execution of the authentication print job, a setting of executing the authentication print job of earliest execution order of the plurality of authentication print jobs is made at the initial setting of the MFP 1. In the MFP according to the third embodiment of the present invention, the user performs further user authentication procedure to select the authentication print job to actually execute the printout process from the plurality of authentication print jobs.

According to such configuration, in the image forming device according to the third embodiment of the present invention, the user can select (increase) the authentication print job to actually execute the printout process with only the user authentication operation of touching the IC card and the like to the predetermined authentication device without being requested complex operations such as login operation and operation of selecting the job through the input unit with respect to the authentication print job in execution queuing.

Thus, in the MFP according to the third embodiment, the user can discharge only the desired printed material with only an easy and convenient operation.

If the setting of executing all authentication print jobs is made at the initial setting of the MFP 1, in the image forming device according to the third embodiment of the present invention, the user can select (decrease) the authentication print job to actually execute the printout process with only the user authentication operation of touching the IC card and the like to the predetermined authentication device without being requested complex operations such as login operation and operation of selecting the job through the input unit with respect to the authentication print job in execution queuing and the like.

Thus, in the MFP according to the third embodiment, the time until completion of discharge of the desired printed material can be reduced, and waste of sources can be suppressed.

<Image Forming System>

The configuration of the image forming system using the image forming device according to the third embodiment of the present invention may be the same as the image forming system 100 shown in FIG. 6 referenced in the description of the first and second embodiments. The description thereof will be omitted herein.

<Hardware Configuration of Image Forming Device>

The configuration of the image forming device according to the third embodiment of the present invention may be the same as the MFP 1 shown in FIG. 7 referenced in the description of the first and second embodiments. Thus, the description thereof will be omitted herein.

<Software Configuration of Image Forming Device>

The software configuration of the image forming device according to the third embodiment of the present invention may be the same as the software configuration shown in FIG. 9 referenced in the description of the first and second embodiments. Thus, the description thereof will be omitted herein.

<Functional Configuration of Image Forming Device>

The functional configuration of the image forming device according to the third embodiment of the present invention may be the same as the functional configuration shown in FIG. 10 referenced in the description of the first and second embodiments. Thus, the description thereof will be omitted herein.

<Image Forming Process Flow>

The flow of the image forming process in the MFP 1 according to the third embodiment of the present invention will now be described with reference to FIGS. 18, 19, and 20.

Figure 18:
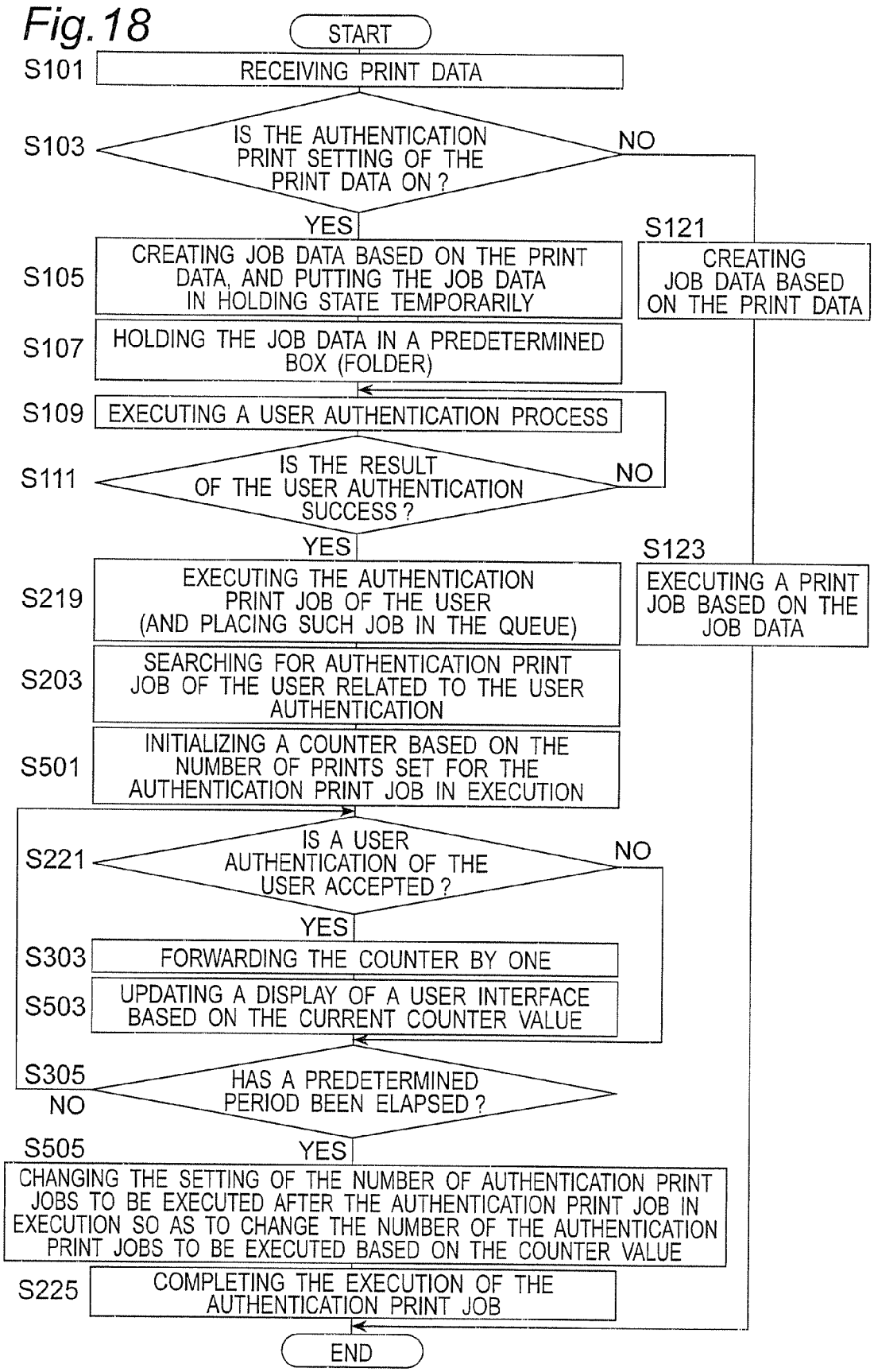
FIG. 18 is a flowchart of the process executed by the MFP 1.

FIG. 18 is a flowchart describing the flow of the image forming process executed in the MFP 1. The already described steps shown in FIGS. 2, 11A, 11B, 16 and 17 are denoted with reference numerals similar to the reference numerals in FIGS. 2, 11A, 11B, 16 and 17. The description of such steps will be appropriately omitted.

The processes from step S101 to step S501 are similar to those already described with reference to FIGS. 2, 11A, 11B, 16 and 17.

FIG. 19 is a list of jobs in execution and in execution queuing acquired as a result of search executed in step S203. Here, five authentication print jobs of the User-A exist.

In step S501, the MFP 1 initializes the value of the counter C'. The initialization process of the value of the counter C' in step S501 differs from the process in step S301 in being executed without referencing the document print set number N currently set to the job data of the authentication print in execution. For instance, the value of the counter C' is initialized to zero.

The processes in step S221 and step S303 are as described above.

In step S503, the MFP 1 changes the setting of the number of authentication print jobs to actually execute based on the current value of the counter C', and changes the display of the display unit 21 to notify such change to the user.

FIG. 20 is a diagram of a display example of the display unit 21 after step S503. Immediately before step S503, the authentication print job to actually execute is only the authentication print job (J2) of earliest execution order based on the setting inside the MFP 1, but the setting is changed to actually execute the printout process for the authentication print job (J5) of next earliest execution order to the job J2 at the present time after the processes of step S221, step S303, and step S503.

The display unit 21 may includes a sort execution button 95 and a screen scroll button 97. When the user pushes the sort execution button 95, the sorting of the list is executed with the user owning the job as a reference.

Figure 21:
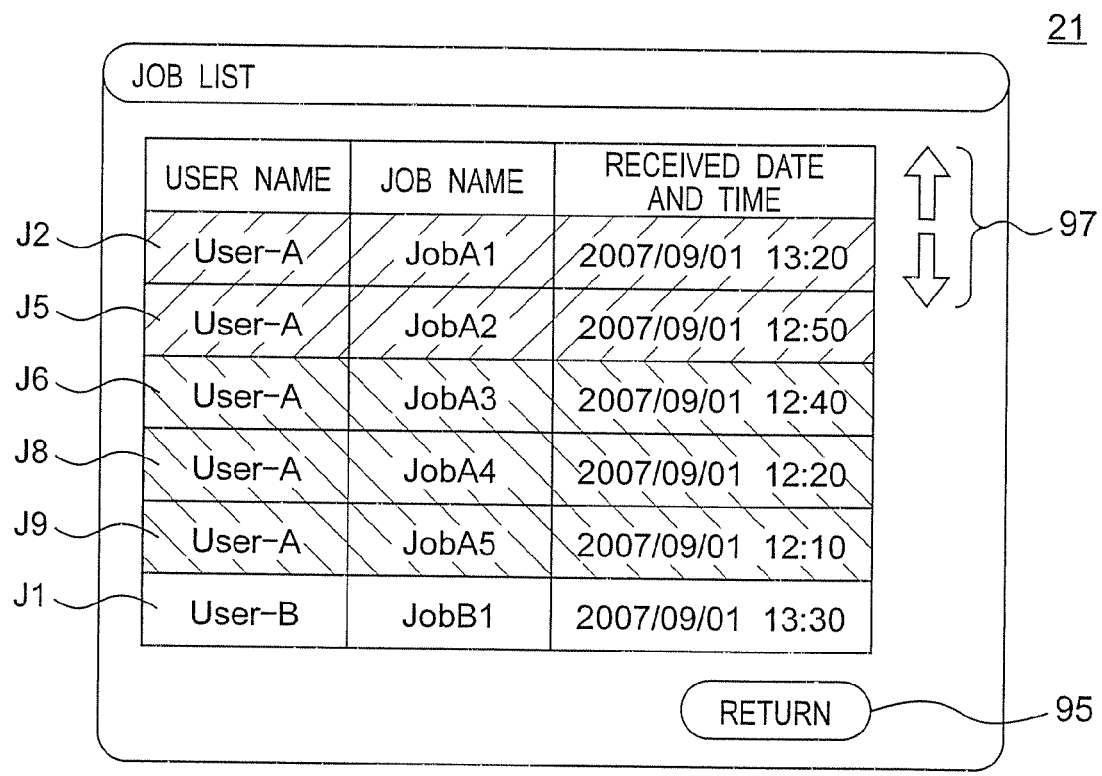
FIG. 21 is a display example of the job list (after sort execution).

FIG. 21 is a diagram of a display example of the display unit 21 after the sort process is executed. The authentication print jobs (J2, J5, J6, J8, J9) owned by the User-A are continuously displayed, and thus the jobs (J2, J5) actually executed with the printout and the jobs (J6, J8, J9) of a setting of no printout are obvious to the user at a glance.

In step S505, the MFP 1 determines the authentication print job to actually execute the printout process, and executes the authentication print job based on the relevant determination.

A time limit as in step S305 does not need to be provided, in which case, the MFP 1 accepts change in setting of actually execute/not execute the printout with respect to the authentication print job in the execution queuing state excluding the authentication print job already in the execution state of the authentication print jobs of the user.

In step S225, the MFP 1 completes the execution of the authentication print job.

Therefore, the image forming device according to the present invention is an image forming device with an extremely enhanced operability capable of changing the settings with respect to the authentication print job in the execution state or the execution queuing state with only the easy and convenient operation (e.g., operation of touching the IC card 65 to the IC card reader 9 (both shown in FIG. 8)) in all embodiments.

The change in setting of the handling of the job data after the job completion, the change in the number of sets of prints of the document, and the change in the authentication print job to actually execute the printout are separately described as the first, the second, and the third embodiments, but it should be recognized that the functions of such embodiments can be simultaneously realized in one MFP.

In the present embodiment, the change in the settings with respect to the authentication print job is realized by counting the "number" of additionally performed user authentications, but the change in the settings with respect to the authentication print job may be realized based on a characteristic time interval (e.g., duration the IC card 65 (FIG. 8) is touched to the IC card reader 9 (FIG. 8)) and the like in the additionally performed user authentication.

The present invention relates to an image forming device in which operability and productivity are enhanced while ensuring security related to the printed material to be discharged. The present invention is useful in the field of image formation.

What is claimed is:

1. An image forming device which is arranged to execute an authentication print job being a print job in which a user authentication is performed using a predetermined authentication device and a start of execution of a printout process is determined based on a result of the user authentication, comprising:

a communication interface that is arranged to receive print data related to a print job;

a non-transitory computer readable memory that is arranged to hold job data for an authentication print job based on the print data;

a job execution unit that is arranged to execute a job based on the job data;

an authentication unit that is the predetermined authentication device;

a user authentication unit that is arranged to output a result of the user authentication using said authentication unit;

a control unit that is arranged to control operations of said job execution unit so as to instruct a start of execution of the authentication print job to said job execution unit based on the user authentication result outputted by said user authentication unit; and an instruction generation unit that is arranged to determine content of a changing instruction for a setting being set with respect to the authentication print job based on an input of a user authentication result and output to said control unit the determined content of the changing instruction, wherein:

said instruction generation unit determines the content of the changing instruction for the setting with respect to at least one authentication print job in at least one of an execution state and an execution queuing state based on the input of the user authentication result that is received in an after user authentication period being a period in which the at least one authentication print job of the user who relates to the input of the user authentication result is in at least one of the execution state and the execution queuing state at said job execution unit and outputs to said control unit the determined content of the changing instruction;

said control unit executes a process of changing the setting with respect to the authentication print job based on the changing instruction; and the changing instruction is an instruction to change a setting for increasing a value of a number of sets of prints of a document with respect to the authentication print job in the execution state by a first print value equal to a value obtained by multiplying a first predetermined value, being a natural number, to a number of inputs of the user authentication result that is received in the after user authentication period.

2. The image forming device according to claim 1, wherein the instruction generation unit outputs the instruction to change the setting with respect to the authentication print job to a setting of deleting the job data related to the authentication print job when the authentication print job is completed based on the input of the user authentication result that is received in the after user authentication period.

3. The image forming device according to claim 1, wherein the instruction generation unit outputs the instruction to change the setting with respect to the authentication print job to a setting of moving the job data related to the authentication print job to a predetermined storage region when the authentication print job is completed based on the input of the user authentication result that is received in the after user authentication period.

4. The image forming device according to claim 3, further comprising an encryption unit that is arranged to encrypt data, wherein the predetermined storage region is a storage region in an external storage device; and said encryption unit encrypts the job data to move to the external storage device.

5. The image forming device according to claim 1, further comprising:

a display unit that is arranged to display a list of authentication print jobs in the execution queuing state; and an input unit that is arranged to accept an input of selection of an authentication print job which is included in the list displayed on said display unit, wherein:

the instruction includes at least one of an instruction to change the setting with respect to the authentication print job included in the input of the selection accepted by said input unit to a setting of deleting the job data related to the authentication print job when the authentication print job is completed, an instruction to change to a setting of moving the job data related to the authentication print job to a predetermined storage region when the authentication print job is completed, and an instruction to cancel the change of the setting to at least one of the deleting and the moving; and said instruction generation unit outputs at least one of the instruction to change to the setting of the deleting, the instruction to change to the setting of the moving, and the instruction to cancel based on a number of inputs of the user authentication result that is received in the after user authentication period.

6. The image forming device according to claim 5, further comprising an encryption unit that is arranged to encrypt data, wherein the predetermined storage region is a storage region in an external storage device; and said encryption unit encrypts the job data to move to the external storage device.

7. The image forming device according to claim 1, wherein the first predetermined value is one.

8. The image forming device according to claim 1, wherein said authentication unit is an IC card reader which is arranged to receive data transmitted from an IC card.

9. The image forming device according to claim 8, wherein the user authentication result received in the after user authentication period includes information about contact duration of the IC card and the IC card reader.

10. The image forming device according to claim 1, wherein said authentication unit is a biometric authentication device.

11. An image forming method in an image forming device which is arranged to execute an authentication print job being a print job in which a user authentication is performed using a predetermined authentication device and a start of execution of a printout process is determined based on a result of the user authentication, comprising:

receiving print data related to a print job by a communication interface unit;

holding job data for an authentication print job based on the print data by a job data holding unit;

outputting a result of the user authentication using an authentication unit being the predetermined authentication device by a user authentication unit;

controlling operations of a job execution unit by a control unit so as to and instruct a start of execution of the authentication print job based on the user authentication result outputted by the user authentication unit;

executing the job based on the job data by the job execution unit;

determining content of a changing instruction for a setting being set with respect to the authentication print job and outputting to the control unit the determined content for the changing instruction based on an input of a user authentication result that is received in an after user authentication period by an instruction generation unit, the after user authentication period being a period in which at least one authentication print job of the user who relates to the input of the user authentication result is in at least one of an execution state and an execution queuing state at the job execution unit;

executing a process of changing the setting related to the at least one authentication print job based on the changing instruction by the control unit;

wherein said outputting by the instruction generation unit includes outputting to the control unit the content of the changing instruction to change the setting with respect to the at least one authentication print job in at least one of the execution state and the execution queuing state based on the input of the user authentication result that is received in the after user authentication period; and wherein the changing instruction is an instruction to change a setting for increasing a value of a number of sets of prints of a document with respect to the authentication print job in the execution state by a first print value equal to a value obtained by multiplying a first predetermined value, being a natural number, to a number of inputs of the user authentication result that is received in the after user authentication period.

12. A non-transitory computer readable medium storing an image forming program executable by a computer of an image forming device which is arranged to execute an authentication print job being a print job in which a user authentication is performed using a predetermined authentication device and a start of execution of a printout process is determined based on a result of the user authentication, the image forming program comprising:

code that causes a communication interface unit to receive print data related to a print job;

code that causes a job data holding unit to hold job data for an authentication print job based on the print data;

code that causes a user authentication unit to output a result of the user authentication using an authentication unit being the predetermined authentication device;

code that causes a control unit to control operations of a job execution unit so as to instruct a start of execution of the authentication print job based on the user authentication result outputted by the user authentication unit;

code that causes a job execution unit to execute the job based on the job data;

code that causes an instruction generation unit to determine content of a changing instruction for a setting being set with respect to the authentication print job and output to the control unit the determined content of the changing instruction based on an input of a user authentication result that is received in an after user authentication period, the after user authentication period being a period in which at least one authentication print job of the user who relates to the input of the user authentication result is in at least one of an execution state and an execution queuing state at the job execution unit;

code that causes the control unit to execute a process of changing the setting related to the at least one authentication print job based on the changing instruction;

wherein said code that causes the instruction generation unit to output includes a function that outputs to the control unit the content of the changing instruction to change the setting with respect to the at least one authentication print job in at least one of the execution state and the execution queuing state based on the input of the user authentication result that is received in the after user authentication period; and wherein the changing instruction is an instruction to change a setting for increasing a value of a number of sets of prints of a document with respect to the authentication print job in the execution state by a first print value equal to a value obtained by multiplying a first predetermined value, being a natural number, to a number of inputs of the user authentication result that is received in the after user authentication period.

13. An image forming device which is arranged to execute an authentication print job being a print job in which a user authentication is performed using a predetermined authentication device and a start of execution of a printout process is determined based on a result of the user authentication, comprising:

a communication interface that is arranged to receive print data related to a print job;

a non-transitory computer readable memory that is arranged to hold job data for an authentication print job based on the print data;

a job execution unit that is arranged to execute a job based on the job data;

an authentication unit that is the predetermined authentication device;

a user authentication unit that is arranged to output a result of the user authentication using said authentication unit;

a control unit that is arranged to control operations of said job execution unit so as to instruct a start of execution of the authentication print job to said job execution unit based on the user authentication result outputted by said user authentication unit;

an instruction generation unit that is arranged to determine content of a changing instruction for a setting being set with respect to the authentication print job based on an input of a user authentication result and output to said control unit the determined content of the changing instruction; and an input unit that is arranged to accept an input of a numerical value;

wherein:

said instruction generation unit determines the content of the changing instruction for the setting with respect to at least one authentication print job in at least one of an execution state and an execution queuing state based on the input of the user authentication result that is received in an after user authentication period being a period in which the at least one authentication print job of the user who relates to the input of the user authentication result is in at least one of the execution state and the execution queuing state at said job execution unit and outputs to said control unit the determined content of the changing instruction;

said control unit executes a process of changing the setting with respect to the authentication print job based on the changing instruction; and the changing instruction is an instruction to change a setting for increasing a value of a number of sets of prints of a document with respect to the authentication print job in the execution state by a second print value equal to a sum of a first print value equal to a value obtained by multiplying a first predetermined value, being a natural number, to a number of inputs of the user authentication result that is received in the after user authentication period, and a value obtained by multiplying a second predetermined value to the numerical value accepted by the input unit.

14. The image forming device according to claim 13, wherein the second print value is ten.

15. An image forming method in an image forming device which is arranged to execute an authentication print job being a print job in which a user authentication is performed using a predetermined authentication device and a start of execution of a printout process is determined based on a result of the user authentication, comprising:

receiving print data related to a print job by a communication interface unit;

holding job data for an authentication print job based on the print data by a job data holding unit;

outputting a result of the user authentication using an authentication unit being the predetermined authentication device by a user authentication unit;

controlling operations of a job execution unit by a control unit so as to and instruct a start of execution of the authentication print job based on the user authentication result outputted by the user authentication unit;

executing the job based on the job data by the job execution unit;

determining content of a changing instruction for a setting being set with respect to the authentication print job and outputting to the control unit the determined content for the changing instruction based on an input of a user authentication result that is received in an after user authentication period by an instruction generation unit, the after user authentication period being a period in which at least one authentication print job of the user who relates to the input of the user authentication result is in at least one of an execution state and an execution queuing state at the job execution unit;

executing a process of changing the setting related to the at least one authentication print job based on the changing instruction by the control unit;

accepting an input of a numerical value by an input unit;

wherein said outputting by the instruction generation unit includes outputting to the control unit the content of the changing instruction to change the setting with respect to the at least one authentication print job in at least one of the execution state and the execution queuing state based on the input of the user authentication result that is received in the after user authentication period; and wherein the changing instruction is an instruction to change a setting for increasing a value of a number of sets of prints of a document with respect to the authentication print job in the execution state by a second print value equal to a sum of a first print value equal to a value obtained by multiplying a first predetermined value, being a natural number, to a number of inputs of the user authentication result that is received in the after user authentication period, and a value obtained by multiplying a second predetermined value to the numerical value accepted by the input unit.

16. A non-transitory computer readable medium storing an image forming program executable by a computer of an image forming device which is arranged to execute an authentication print job being a print job in which a user authentication is performed using a predetermined authentication device and a start of execution of a printout process is determined based on a result of the user authentication, the image forming program comprising:

code that causes a communication interface unit to receive print data related to a print job;

code that causes a job data holding unit to hold job data for an authentication print job based on the print data;

code that causes a user authentication unit to output a result of the user authentication using an authentication unit being the predetermined authentication device;

code that causes a control unit to control operations of a job execution unit so as to instruct a start of execution of the authentication print job based on the user authentication result outputted by the user authentication unit;

code that causes a job execution unit to execute the job based on the job data;

code that causes an instruction generation unit to determine content of a changing instruction for a setting being set with respect to the authentication print job and output to the control unit the determined content of the changing instruction based on an input of a user authentication result that is received in an after user authentication period, the after user authentication period being a period in which at least one authentication print job of the user who relates to the input of the user authentication result is in at least one of an execution state and an execution queuing state at the job execution unit;

code that causes the control unit to execute a process of changing the setting related to the at least one authentication print job based on the changing instruction;

code that causes an input unit to accept an input of a numerical value;

wherein said code that causes the instruction generation unit to output includes a function that outputs to the control unit the content of the changing instruction to change the setting with respect to the at least one authentication print job in at least one of the execution state and the execution queuing state based on the input of the user authentication result that is received in the after user authentication period; and wherein the changing instruction is an instruction to change a setting for increasing a value of a number of sets of prints of a document with respect to the authentication print job in the execution state by a second print value equal to a sum of a first print value equal to a value obtained by multiplying a first predetermined value, being a natural number, to a number of inputs of the user authentication result that is received in the after user authentication period, and a value obtained by multiplying a second predetermined value to the numerical value accepted by the input unit.

\* \* \* \* \*